US012217395B2

(12) United States Patent
Jeon et al.

(10) Patent No.: US 12,217,395 B2
(45) Date of Patent: Feb. 4, 2025

(54) EXEMPLAR-BASED OBJECT APPEARANCE TRANSFER DRIVEN BY CORRESPONDENCE

(71) Applicant: ADOBE INC., San Jose, CA (US)

(72) Inventors: Sangryul Jeon, Seoul (KR); Zhifei Zhang, San Jose, CA (US); Zhe Lin, Clyde Hill, WA (US); Scott Cohen, Cupertino, CA (US); Zhihong Ding, Davis, CA (US)

(73) Assignee: ADOBE INC., San Jose, CA (US)

( * ) Notice: Subject to any disclaimer, the term of this patent is extended or adjusted under 35 U.S.C. 154(b) by 374 days.

(21) Appl. No.: 17/660,968

(22) Filed: Apr. 27, 2022

(65) Prior Publication Data

US 2023/0351566 A1    Nov. 2, 2023

(51) Int. Cl.
*G06V 10/774* (2022.01)
*G06T 5/50* (2006.01)
*G06V 10/40* (2022.01)
*G06V 10/44* (2022.01)
*G06V 10/75* (2022.01)
*G06V 10/77* (2022.01)

(52) U.S. Cl.
CPC .............. *G06T 5/50* (2013.01); *G06V 10/454* (2022.01); *G06V 10/513* (2022.01); *G06V 10/751* (2022.01); *G06V 10/7715* (2022.01); *G06V 10/774* (2022.01); *G06T 2207/20081* (2013.01); *G06T 2207/20221* (2013.01)

(58) Field of Classification Search
CPC ............. G06T 5/50; G06T 2207/20081; G06T 2207/20221; G06T 2200/24; G06T 11/60; G06V 10/454; G06V 10/513; G06V 10/751; G06V 10/7715; G06V 10/774; G06V 10/82; G06V 40/16
See application file for complete search history.

(56) References Cited

U.S. PATENT DOCUMENTS

| 2022/0198691 A1* | 6/2022 | Chen | G06V 10/25 |
| 2022/0207678 A1* | 6/2022 | Yao | G06T 5/50 |
| 2022/0222872 A1* | 7/2022 | Ghosh | G06T 11/001 |

(Continued)

OTHER PUBLICATIONS

1Chen, et al., "StyleBank: An Explicit Representation for Neural Image Style Transfer", In Proceedings of the IEEE conference on computer vision and pattern recognition, pp. 1897-1906, 2017.

(Continued)

*Primary Examiner* — Iriana Cruz
(74) *Attorney, Agent, or Firm* — F. CHAU & ASSOCIATES, LLC

(57) ABSTRACT

Systems and methods for image processing are configured. Embodiments of the present disclosure encode a content image and a style image using a machine learning model to obtain content features and style features, wherein the content image includes a first object having a first appearance attribute and the style image includes a second object having a second appearance attribute; align the content features and the style features to obtain a sparse correspondence map that indicates a correspondence between a sparse set of pixels of the content image and corresponding pixels of the style image; and generate a hybrid image based on the sparse correspondence map, wherein the hybrid image depicts the first object having the second appearance attribute.

18 Claims, 16 Drawing Sheets

(56) References Cited

U.S. PATENT DOCUMENTS

| | | | | |
|---|---|---|---|---|
| 2023/0154040 A1* | 5/2023 | Guo | ................... | G06V 40/169 |
| | | | | 382/103 |
| 2023/0245351 A1* | 8/2023 | Cao | ..................... | G06T 11/001 |
| | | | | 345/629 |

OTHER PUBLICATIONS

2 Chen, et al., "A Simple Framework for Contrastive Learning of Visual Representations", In Proceedings of the 37th International Conference on Machine Learning, pp. 1597-1607, PMLR, 2020.

3 Cho, et al., "Semantic Correspondence with Transformers", arXiv preprint arXiv:2106.02520v1 [cs.CV] Jun. 4, 2021, 18 pages.

4 Choy, et al., "Universal Correspondence Network", 30th Conference on Neural Information Processing Systems (NIPS 2016), 9 pages.

5 Gatys, et al., "Image Style Transfer Using Convolutional Neural Networks", In Proceedings of the IEEE conference on computer vision and pattern recognition, pp. 2414-2423, 2016.

6 Grill, et al., "Bootstrap Your Own Latent A New Approach to Self-Supervised Learning", arXiv preprint arXiv:2006.07733v3 [cs.LG] Sep. 10, 2020, 35 pages.

7 He, et al., "Momentum Contrast for Unsupervised Visual Representation Learning", In Proceedings of the IEEE/CVF Conference on Computer Vision and Pattern Recognition, pp. 9729-9738, 2020.

8 Huang, et al., "Arbitrary Style Transfer in Real-time with Adaptive Instance Normalization", In Proceedings of the IEEE International Conference on Computer Vision, pp. 1501-1510, 2017.

9 Jeon, et al., "Joint Learning of Semantic Alignment and Object Landmark Detection", In Proceedings of the IEEE/CVF International Conference on Computer Vision, pp. 7294-7303, 2019.

10 Johnson, et al., "Perceptual Losses for Real-Time Style Transfer and Super-Resolution", In European conference on computer vision, pp. 694-711, Springer, 2016.

11 Karras, et al., "Analyzing and Improving the Image Quality of StyleGAN", In Proceedings of the IEEE/CVF Conference on Computer Vision and Pattern Recognition, pp. 8110-8119, 2020.

12 Kim, et al., "FCSS: Fully Convolutional Self-Similarity for Dense Semantic Correspondence", In Proceedings of the IEEE conference on computer vision and pattern recognition, pp. 6560-6569, 2017.

13 Kim, et al., "Deformable Style Transfer", In Computer Vision—ECCV 2020: 16th European Conference, Glasgow, UK, Aug. 23-28, 2020, Proceedings, Part XXVI 16, pp. 246-261, Springer, arXiv preprint arXiv:2003.11038v2 [cs.CV] Jul. 20, 2020.

14 Kolkin, et al., "Style Transfer by Relaxed Optimal Transport and Self-Similarity", In Proceedings of the IEEE/CVF Conference on Computer Vision and Pattern Recognition, pp. 10051-10060, 2019.

15 Liu, et al., "Learning to Warp for Style Transfer", In Proceedings of the IEEE/CVF Conference on Computer Vision and Pattern Recognition, pp. 3702-3711, 2021.

16 Min, et al., "Convolutional Hough Matching Networks", In Proceedings of the IEEE/CVF Conference on Computer Vision and Pattern Recognition, pp. 2940-2950, 2021.

17 Min, et al., "Hypercorrelation Squeeze for Few-Shot Segmentation", arXiv preprint arXiv:2104.01538, 2021.

18 Park, et al., "Contrastive Learning for Unpaired Image-to-Image Translation", In European Conference on Computer Vision, pp. 319-345, Springer, 2020.

19 Park, et al., "Swapping Autoencoder for Deep Image Manipulation", arXiv preprint arXiv:2007.00653v2 [cs.CV] Dec. 14, 2020, 23 pages.

20 Rocco, et al., "Neighbourhood Consensus Networks", In Proceedings of the 32nd Conference on Neural Information Processing Systems, arXiv preprint arXiv:1810.10510v2 [cs.CV] Nov. 29, 2018, 20 pages.

21 Shi, et al., "WarpGAN: Automatic Caricature Generation", In Proceedings of the IEEE/CVF Conference on Computer Vision and Pattern Recognition, pp. 10762-10771, 2019.

22 Tov, et al., "Designing an Encoder for StyleGAN Image Manipulation", ACM Transactions on Graphics (TOG), 40(4):1-14, arXiv preprint arXiv:2102.02766v1 [cs.CV] Feb. 4, 2021.

23 Ulyanov, et al., "Texture Networks: Feed-forward Synthesis of Textures and Stylized Images", In ICML, vol. 1, p. 4, arXiv preprint arXiv:1603.03417v1 [cs.CV] Mar. 10, 2016, 16 pages.

24 Zhang, et al., "Image Super-Resolution by Neural Texture Transfer", In Proceedings of the IEEE/CVF Conference on Computer Vision and Pattern Recognition, pp. 7982-7991, 2019.

\* cited by examiner

EXEMPLAR-BASED OBJECT APPEARANCE TRANSFER DRIVEN BY CORRESPONDENCE

BACKGROUND

The following relates generally to digital image processing, and more specifically to object appearance transfer using machine learning. Digital image processing refers to the use of a computer to edit a digital image or synthesize an image using an algorithm or a processing network. Object appearance transfer is a subfield of image processing. A machine learning model is used to generate an appearance-transferred image (i.e., hybrid image) through transferring style information from a style image into a content image.

Conventional image processing systems are unable to handle appearance transfer when objects in the content image and the style image are complex and have extensive geometry variations. As a result, appearance-transferred images generated from these systems fail to capture detailed textures from the style image while retaining the spatial structure from the content image. Therefore, there is a need in the art for an improved image processing system that can efficiently and accurately perform object appearance transfer.

SUMMARY

The present disclosure describes systems and methods for image processing. Embodiments of the present disclosure include an image processing apparatus configured to perform correspondence-driven object appearance transfer based on a pair of content image and style image. An image processing apparatus aligns content features from the content image and the style features from the style image to obtain a sparse correspondence map (i.e., a sparse mapping of points from one image to the other). In some examples, the sparse correspondence map relates to multiple scales. The hybrid image is then generated to include appearance and texture attributes from the style image while maintaining spatial structures of objects in the content image.

A method, apparatus, and non-transitory computer readable medium for image processing are described. One or more embodiments of the method, apparatus, and non-transitory computer readable medium include encoding a content image and a style image using a machine learning model to obtain content features and style features, wherein the content image includes a first object having a first appearance attribute and the style image includes a second object having a second appearance attribute; aligning the content features and the style features to obtain a sparse correspondence map that indicates a correspondence between a sparse set of pixels of the content image and corresponding pixels of the style image; and generating a hybrid image based on the sparse correspondence map, wherein the hybrid image depicts the first object having the second appearance attribute.

A method, apparatus, and non-transitory computer readable medium for training a machine learning model are described. One or more embodiments of the method, apparatus, and non-transitory computer readable medium include receiving a training set including a content image and a style image; encoding the content image and the style image using a machine learning model to obtain content features and style features; aligning the content features and the style features to obtain a sparse correspondence map that indicates a correspondence between a sparse set of pixels of the content image and corresponding pixels of the style image; generating a hybrid image based on the sparse correspondence map, wherein the hybrid image depicts an object from the content image and an appearance attribute from the style image; and updating parameters of the machine learning model based on the hybrid image.

An apparatus and method for image processing are described. One or more embodiments of the apparatus and method include an image encoder configured to encode a content image and a style image using a machine learning model to obtain content features and style features, wherein the content image includes a first object having a first appearance attribute and the style image includes a second object having a second appearance attribute; an alignment component configured to align the content features and the style features to obtain a sparse correspondence map that indicates a correspondence between a sparse set of pixels of the content image and corresponding pixels of the style image; and an image decoder configured to generate a hybrid image based on the sparse correspondence map, wherein the hybrid image depicts the first object having the second appearance attribute.

DETAILED DESCRIPTION

Figure 1:
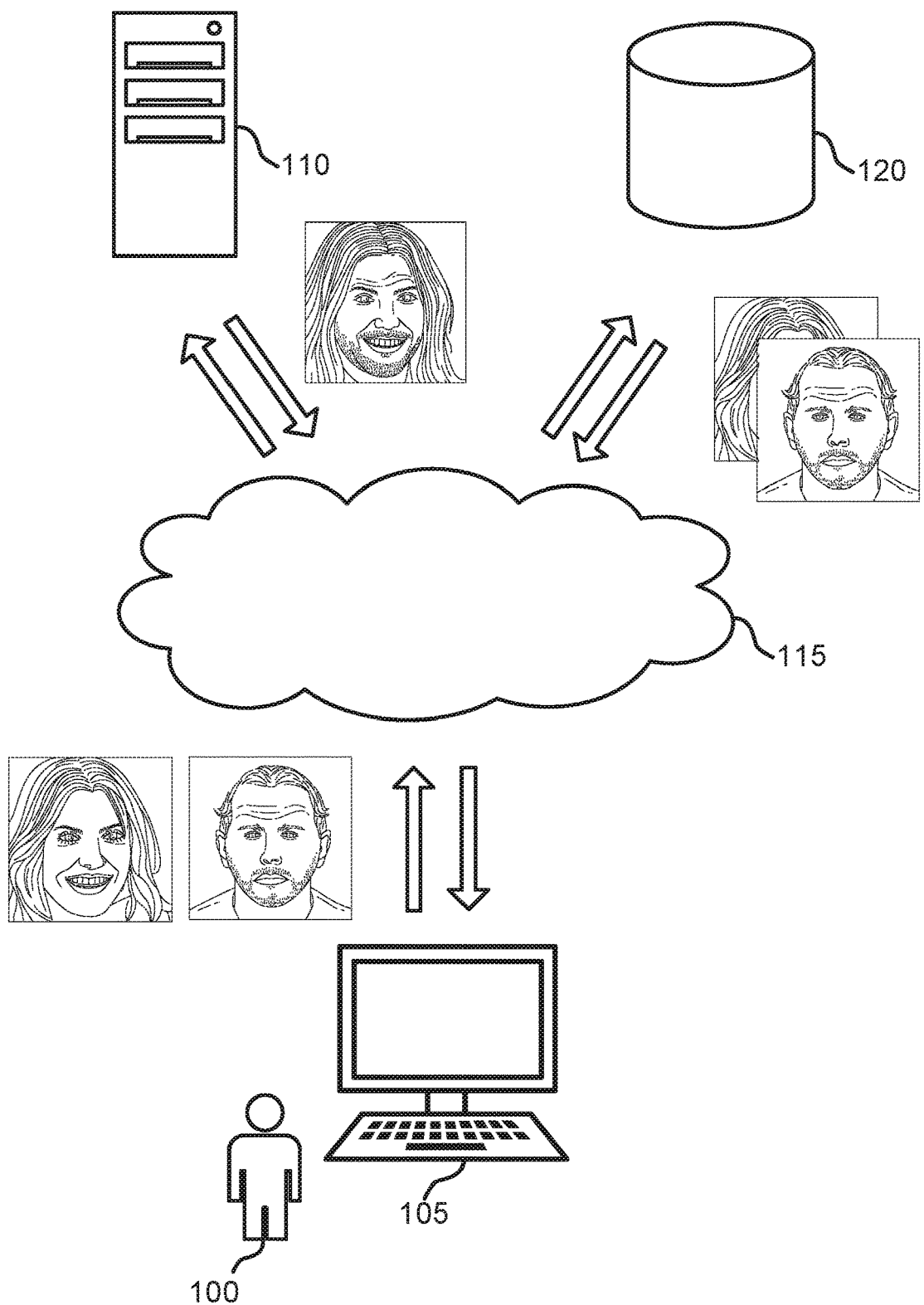
FIG. 1 shows an example of an image processing system according to aspects of the present disclosure.

The present disclosure describes systems and methods for image processing. Embodiments of the present disclosure include an image processing apparatus configured to perform correspondence-driven object appearance transfer based on a pair of content image and style image. The image processing apparatus, via an alignment component, aligns the content features and the style features to obtain a sparse correspondence map (i.e., sparse mapping of points from one image to the other). In some examples, the sparse correspondence map is used to spatially align texture features of a style image to content features of a content image at multiple scales. The hybrid image generated by the image processing apparatus incorporates appearance and textures from the style image while maintaining object spatial structure as in the content image. The sparse correspondence mapping increases the effectiveness of the decoder (i.e., an image generation network) in generating a hybrid that balances the appearance transfer while maintaining the desired structure.

In some embodiments, users can choose a selectable parameter for determining where in the image decoder to apply the content and style features, which changes how the pair of content image and style image are merged. The selectable parameter is chosen based on a desired level of texture detail to be transferred from the style image to the content image.

Conventional image processing systems rely on image-to-image translation methods to handle tasks such as image inpainting, photorealistic style transfer, object replacement, etc. Conventional exemplar-driven systems factorize the visual information into content and style component and re-render the structure of the content image using the style from one or more style exemplars. However, these conventional systems fail to consider fine-grained local appearance and geometry variations. In some cases, appearance-transferred images suffer from structural distortion of objects and/or undesirable textures due to lack of understanding of semantic correspondences between a content image and a style image.

Embodiments of the present disclosure include an image processing apparatus configured to generate a synthesized image based on a pair of content image and style image, where the synthesized image incorporates appearance information from the style image while preserving object structure as in the content image. A machine learning model is configured to integrate correspondence estimation and multi-scale style transfer based on the content image and style image. An alignment component of the machine learning model generates content and style features and aligns the style features to the content features based on correspondence at multiple scales. Unlike dense correspondence maps that depend on precise correspondences for all the pixels, the alignment component constructs a sparse correspondence map that includes sparse but confident correspondences for feature mapping. The aligned multi-scale feature maps encode spatial and local textural information (i.e., fine-grained details) in addition to global style information. Accordingly, the image processing apparatus can process complex pair of content and style images and still maintain visual accuracy even when a content image and a style image have extensive geometry and appearance variations.

According to at least one embodiment, users can choose a selectable parameter for determining where in the image decoder to apply the content features and style features for decoding. In some examples, the image decoder comprises a generative adversarial network (GAN) such as a StyleGan model. High-level structure information from content features is input to the early layers of the image decoder. Low-level texture information from aligned style features is input to the late layers or subsequent layers of the image decoder. Accordingly, users can determine a desired level of detail to be transferred from the style image to the content image. Accuracy of object appearance transfer is increased. Object structure and content information is preserved.

Additionally, by using correspondence contrastive loss (CCL), a training component locates hard negative samples based on correspondences to further improve the disentanglement of structure features and texture features. Because randomly cropped negatives may not efficiently distinguish where the textures of interest are located and these random negatives have background clutter or occluded regions, the correspondence contrastive loss is used to identify and select negative samples by ranking the patches based on the corresponding correspondences. Training the machine learning model based on the correspondence contrastive loss leads to capturing relatively rich texture information.

As a result, the quality of fine-grained texture transfer is increased and the spatial structure of objects from a content image is preserved. The machine learning model is trained in a self-supervised manner without extra supervision such as segmentation, face, or body parsing. The machine learning model is scalable to process generic objects for high-quality appearance transfer, i.e., transferring fine-grained textures while preserving object structure at the same time.

Embodiments of the present disclosure may be used in the context of image processing applications. For example, an image processing network based on the present disclosure takes a content image and a style image and synthesizes a hybrid image for subsequent user editing. An example application of the inventive concept in the image processing context is provided with reference to FIG. 5. Details regarding the architecture of an example image processing apparatus are provided with reference to FIGS. 1-4. Example processes for image processing are provided with reference to FIGS. 6-13. Example training processes are described with reference to FIGS. 14-16.

Network Architecture

In FIGS. 1-4, an apparatus and method for image processing are described. One or more embodiments of the apparatus and method include an image encoder configured to encode a content image and a style image using a machine learning model to obtain content features and style features, wherein the content image includes a first object having a first appearance attribute and the style image includes a second object having a second appearance attribute; an alignment component configured to align the content features and the style features to obtain a sparse correspondence map that indicates a correspondence between a sparse set of pixels of the content image and corresponding pixels of the style image; and an image decoder configured to generate a hybrid image based on the sparse correspondence map, wherein the hybrid image depicts the first object having the second appearance attribute.

In some examples, the image encoder comprises a multi-scale convolutional neural network (CNN). In some examples, the image decoder comprises a generative adversarial network (GAN).

Some examples of the apparatus and method further include a modulation encoder configured to project feature maps from the image encoder into an input vector space of the image decoder.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 2.

In an example of FIG. 1, user 100 uploads a pair of content image and style image. User 100 is interested in transferring style information of the style image (e.g., appearance, facial attributes, texture information) to the content image. The pair of content image and style image is then sent to image processing apparatus 110, e.g., via user device 105 and cloud 115. Image processing apparatus 110 encodes the content image and the style image using a machine learning model to obtain content features and style features. As an example, the content image depicts a female and her face. The style image depicts a male and his face. In some examples, the pair of content image and style image is retrieved from database 120 instead of being uploaded by user 100 and then transmitted to image processing apparatus 110 via cloud 115 for appearance transfer.

Image processing apparatus 110 is configured to align the content features and the style features to obtain a sparse correspondence map that indicates a correspondence between a sparse set of pixels of the content image and corresponding pixels of the style image. Image processing apparatus 110 generates a hybrid image based on the sparse correspondence map. In the above example, the hybrid image depicts a person's face having substantial similar appearances as the male in the style image. The person in the hybrid image has similar wrinkles, beard, and eye lashes as the male in the style image. Additionally, object structure and spatial arrangement (i.e., person in the hybrid image) is preserved just as the female of the content image. The hybrid image is transmitted to user 100, e.g., via user device 105 and cloud 115. In some cases, the hybrid image may also be referred to as a style-transferred image or a synthesized image.

User device 105 may be a personal computer, laptop computer, mainframe computer, palmtop computer, personal assistant, mobile device, or any other suitable processing apparatus. In some examples, user device 105 includes software that incorporates an image processing application (e.g., an image editing application). In some examples, the image editing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Image processing apparatus 110 encode a content image and a style image using a machine learning model to obtain content features and style features, respectively. The content image includes a first object having a first appearance attribute and the style image includes a second object having a second appearance attribute. Then, image processing apparatus 110 aligns the content features and the style features to obtain a sparse correspondence map that indicates a correspondence between a sparse set of pixels of the content image and corresponding pixels of the style image. Image processing apparatus 110 generates a hybrid image based on the sparse correspondence map, such that the hybrid image depicts the first object having the second appearance attribute. Image processing apparatus 110 returns the hybrid image (e.g., a style-transferred image having texture details transferred from the style image to the content image) to user 100. The process of using image processing apparatus 110 is further described with reference to FIG. 5.

Image processing apparatus 110 includes a computer implemented network comprising an image encoder, an alignment component, an image decoder, and a modulation encoder. Image processing apparatus 110 may also include a processor unit, a memory unit, an I/O module, and a training component. The training component is used to train a machine learning model (or an image processing network). Additionally, image processing apparatus 110 can communicate with database 120 via cloud 115. In some cases, the architecture of the image processing network is also referred to as a network or a network model. Further detail regarding the architecture of image processing apparatus 110 is provided with reference to FIGS. 1-4. Further detail regarding the operation of image processing apparatus 110 is provided with reference to FIGS. 5-13.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data such as style images and content images in a specified format known as a schema. Style images and content images are transmitted from database 120 via cloud 115 to image processing apparatus 110 for appearance/style transfer and image synthesis. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
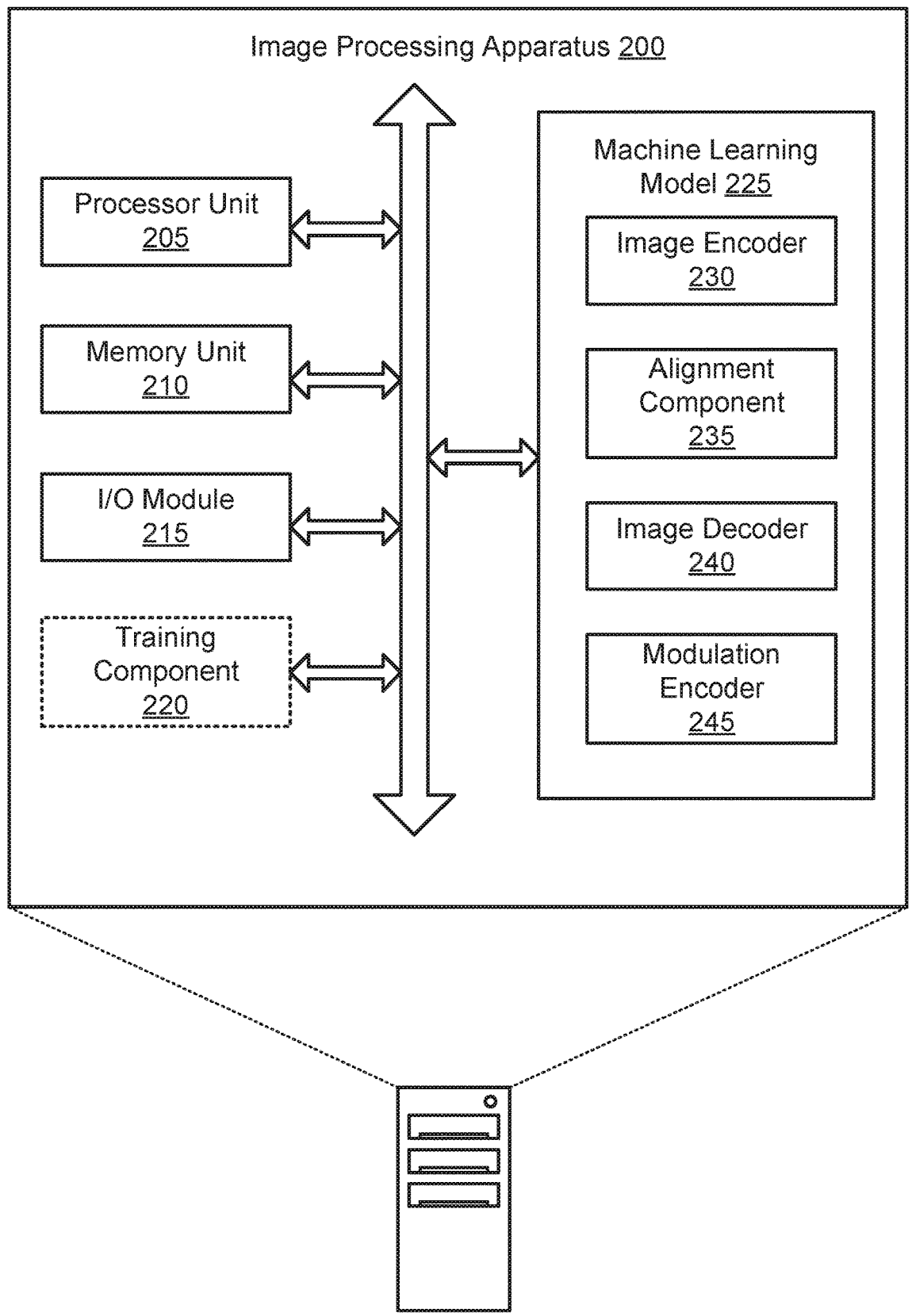
FIG. 2 shows an example of an image processing apparatus according to aspects of the present disclosure.

FIG. 2 shows an example of an image processing apparatus 200 according to aspects of the present disclosure. The example shown includes image processing apparatus 200, processor unit 205, memory unit 210, I/O module 215, training component 220, and machine learning model 225. In one embodiment, machine learning model 225 includes image encoder 230, alignment component 235, image decoder 240, and modulation encoder 245. Image processing apparatus 200 is an example of, or includes aspects of, the corresponding element described with reference to FIG. 1.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 215 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image processing apparatus 200 includes a computer implemented artificial neural network (ANN) for aligning content features and style features to obtain a sparse correspondence map based on a content image and a style image. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image processing apparatus 200 includes a convolutional neural network (CNN) for image processing. CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 220 receives a training set including a content image and a style image. In some examples, training component 220 updates parameters of machine learning model 225 based on the hybrid image. In some examples, training component 220 generates a negative sample pair by randomly cropping the content image. Training component 220 generates a positive sample pair by cropping the content image based on the pixel-wise similarity score. Training component 220 computes a correspondence contrastive loss based on the negative sample pair and the positive sample pair, where the parameters of machine learning model 225 are updated based on the correspondence contrastive loss. In some examples, training component 220 computes a regularization loss based on the content features, the style features, and the hybrid features, where the parameters of machine learning model 225 are updated based on the regularization loss.

In some examples, training component 220 generates a reconstructed content image based on the content features. In some examples, training component 220 computes a reconstruction loss based on the content image and the reconstructed content image, where the parameters of machine learning model 225 are updated based on the reconstruction loss. In some embodiments, training component 220 from a different apparatus other than image processing apparatus 200 can be used to train machine learning model 225.

According to some embodiments, machine learning model 225 identifies a layer index for a decoder of machine learning model 225. In some examples, machine learning model 225 provides the content features as a first input to at least one layer of the decoder having a first index that is less than the layer index. Machine learning model 225 provides the aligned style features as a second input to at least one subsequent layer of the decoder having a second index that is greater than the layer index, where the hybrid image includes an output of the decoder. In some examples, machine learning model 225 determines a desired level of detail to be transferred from the style image to the content image. Machine learning model 225 selects the layer index based on the desired level of detail. In some examples, the second appearance attribute includes color information, texture information, or a combination thereof. Machine learning model 225 is an example of, or includes aspects of, the corresponding element described with reference to FIGS. 3 and 4.

According to some embodiments, image encoder 230 encodes a content image and a style image to obtain content features and style features, where the content image includes a first object having a first appearance attribute and the style image includes a second object having a second appearance attribute. In some examples, image encoder 230 generates a first content feature map at a first scale and a second content feature map at a second scale, where the content features include the first content feature map and the second content feature map. In some examples, image encoder 230 generates a first style feature map at a first scale and a second style feature map at a second scale, where the style features include the first style feature map and the second style feature map. In some examples, image encoder 230 encodes the hybrid image to obtain hybrid features. In some examples, image encoder 230 includes a multi-scale convolutional neural network (CNN). Image encoder 230 is an example of, or includes aspects of, the corresponding element described with reference to FIGS. 3, 4, and 16.

According to some embodiments, alignment component 235 aligns the content features and the style features to obtain a sparse correspondence map that indicates a correspondence between a sparse set of pixels of the content image and corresponding pixels of the style image. In some examples, alignment component 235 computes a pixel-wise similarity score between a pixel from the content image and a pixel from the style image based on the content features and the style features. Alignment component 235 includes the pixel from the content image in the sparse set of pixels of the content image based on the pixel-wise similarity score.

In some examples, alignment component 235 computes a first maximum pixel-wise similarity score for the pixel from the content image. Alignment component 235 computes a second maximum pixel-wise similarity score for the pixel from the style image. Alignment component 235 computes a consistency score based on the first maximum pixel-wise similarity score and the second maximum pixel-wise similarity score, where the pixel from the content image is included in the sparse set of pixels of the content image based on the consistency score. In some examples, alignment component 235 combines the sparse correspondence map with the style features to obtain aligned style features. In some examples, alignment component 235 determines that the second object corresponds to the first object, where the alignment is based on the determination.

In some examples, alignment component 235 identifies a first set of objects in the content image. Alignment component 235 identifies a second set of objects in the style image. Alignment component 235 maps the first set of objects to the second set of objects, where the alignment is based on the mapping. Alignment component 235 is an example of, or includes aspects of, the corresponding element described with reference to FIGS. 3, 4, and 16.

According to some embodiments, image decoder 240 generates a hybrid image based on the sparse correspondence map, where the hybrid image depicts the first object having the second appearance attribute.

According to some embodiments, image decoder 240 generates a hybrid image based on the sparse correspondence map, where the hybrid image depicts an object from the content image and an appearance attribute from the style image. In some examples, image decoder 240 generates a reconstructed style image based on the style features, where the reconstruction loss is computed based on the style image and the reconstructed style image. In some examples, image decoder 240 includes a generative adversarial network (GAN). Image decoder 240 is an example of, or includes aspects of, the corresponding element described with reference to FIGS. 3, 4, and 16.

According to some embodiments, modulation encoder 245 is configured to project feature maps from image encoder 230 into an input vector space of image decoder 240. Modulation encoder 245 is an example of, or includes aspects of, the corresponding element described with reference to FIG. 4.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 3:
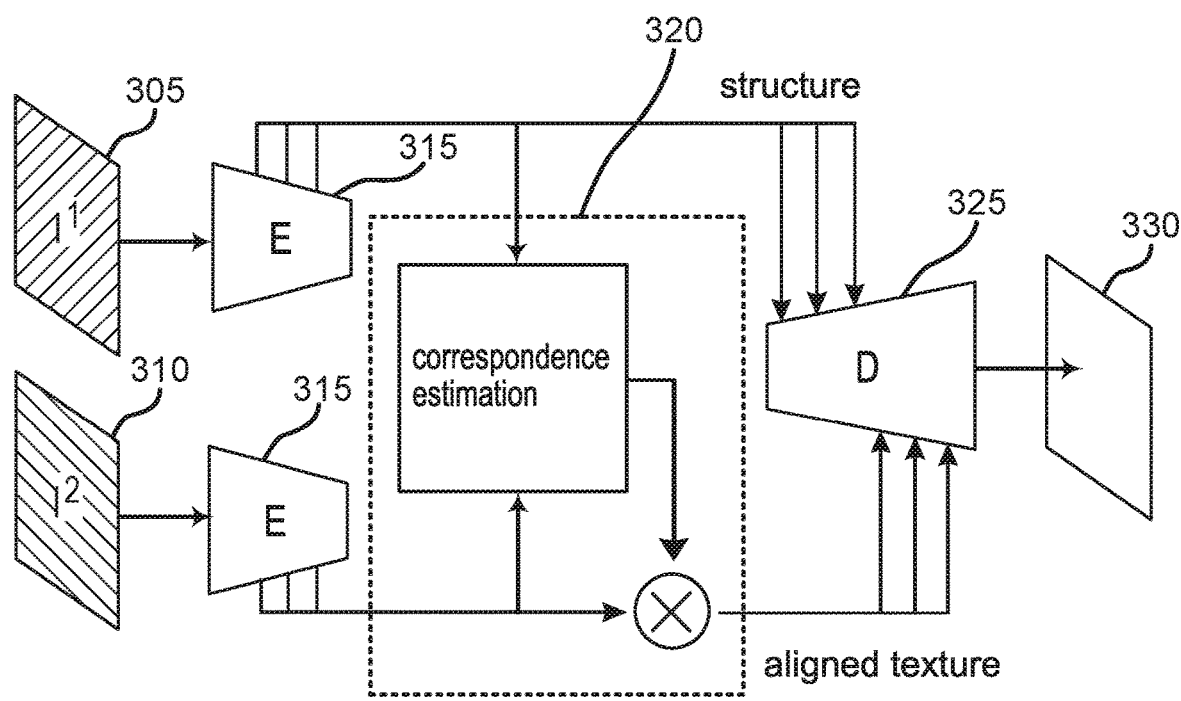
FIG. 3 shows an example of an image processing diagram including correspondence estimation according to aspects of the present disclosure.

FIG. 3 shows an example of an image processing diagram including correspondence estimation according to aspects of the present disclosure. The example shown includes machine learning model 300, content image 305, style image 310, image encoder 315, alignment component 320, image decoder 325, and hybrid image 330. Machine learning model 300 is also described with reference to FIG. 2. Machine learning model 300 is an example of, or includes aspects of, the corresponding element described with reference to FIGS. 2 and 4.

Machine learning model 300 incorporates correspondence estimation into the hierarchy of encoder and decoder. Machine learning model 300 is configured to increase performance of fine-grained texture transfer and preserve the structure of the objects in the content image at the same time.

Machine learning model 300 includes three modules/stages, i.e., latent extraction, latent alignment, and latent decoding. The three stages will be described below in greater detail in FIG. 4. According to an embodiment, at latent extraction stage, image encoder 315 extracts feature maps from input image pair (i.e., via encoder E). The input image pair includes content image 305 and style image 310. Content image 305 is an example of, or includes aspects of, the corresponding element described with reference to FIGS. 4, 6, 13, 15, and 16. Style image 310 is an example of, or includes aspects of, the corresponding element described with reference to FIGS. 4, 6, 13, 15, and 16. Image encoder 315 is an example of, or includes aspects of, the corresponding element described with reference to FIGS. 2, 4, and 16.

At latent alignment stage, alignment component 320 spatially aligns multi-scale features from the style image to the multi-scale features from the structure input. Alignment component 320 is an example of, or includes aspects of, the corresponding element described with reference to FIGS. 2, 4, and 16.

According to some embodiments of the present disclosure, machine learning model 300 uses spatial correspondences to increase the quality of object texture transfer. The correspondence is estimated at multiple scales. Thus, texture features in both coarser and finer scales are aligned to enable appearance style transfer covering both low-level and high-level textures. A self-supervised training method used to train machine learning model 300 will be described in greater detail in FIGS. 14 to 16.

At latent decoding stage, image decoder 325 takes the structure features as input and aligns texture features to generate hybrid image 330 (i.e., an appearance-transferred image). As shown in FIG. 3, the content feature maps are input to the first n modulation layers of image decoder 325 (i.e., D) to preserve the structure from content image 305. The rest layers of image decoder 325 are modulated by the aligned style feature maps to transfer high-fidelity textures from style image 310. Users can adjust size of n to determine the amount of texture details transferred from style image 310 to content image 305. Image decoder 325 is an example of, or includes aspects of, the corresponding element described with reference to FIGS. 2, 4, and 16. Hybrid image 330 is an example of, or includes aspects of, the corresponding element described with reference to FIGS. 4, 6, and 16.

Figure 4:
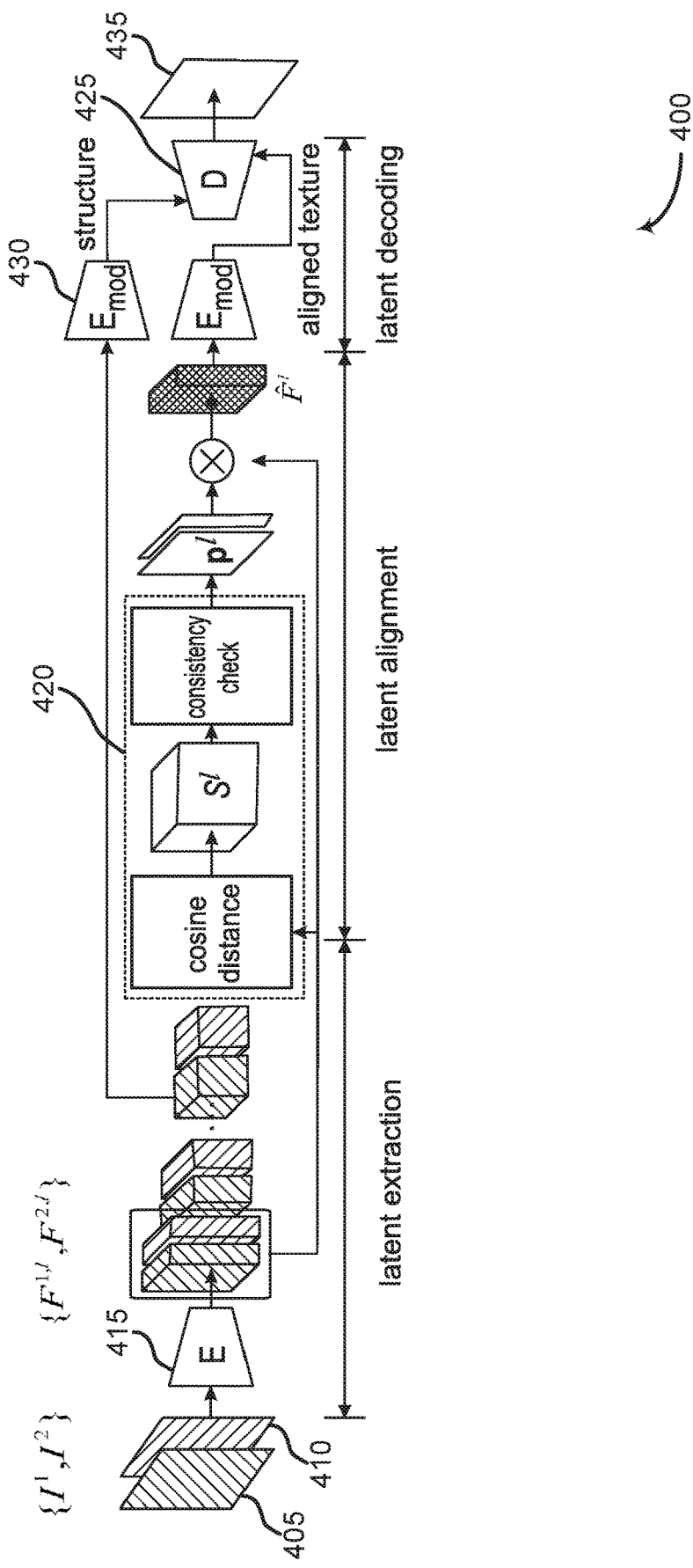
FIG. 4 shows an example of a machine learning model according to aspects of the present disclosure.

FIG. 4 shows an example of a machine learning model according to aspects of the present disclosure. The example shown includes machine learning model 400, content image 405, style image 410, image encoder 415, alignment component 420, image decoder 425, modulation encoder 430, and hybrid image 435.

In some embodiments, given a content-style image pair $\{I^1, I^2\}$, the appearance of the style image $I^2$ is transferred to the content image $I^1$, while preserving the high-level structure of content image 405 at the same time. In some examples, content image 405 is denoted as $I^1$ while style image 410 is denoted as $I^2$. Content image 405 is an example of, or includes aspects of, the corresponding element described with reference to FIGS. 3, 6, 13, 15, and 16. Style image 410 is an example of, or includes aspects of, the corresponding element described with reference to FIGS. 3, 6, 13, 15, and 16.

The style transferring process involves embedding content image 405 and style image 410 into a latent space and synthesizing an appearance-transferred image through an optimization-based algorithm. In some cases, image encoder 415 is configured to embed content image 405 and style image 410 to obtain $\{F^1, F^2\}$. Next, the transferred image $I^{2 \rightarrow 1}$ is synthesized through an optimization-based algorithm or image decoder 425.

According to some embodiments, machine learning model 400 includes three stages or phases, i.e., latent extraction, latent alignment, and latent decoding. At latent extraction phase, image encoder 415 extracts feature maps from input image pair using encoder E. At latent alignment phase, alignment component 420 is configured to spatially align multi-scale features from style image 410 to the multi-scale features from content image 405 (i.e., structure input). At latent decoding phase, image decoder 425 takes the structure features as input and aligns texture features to generate appearance-transferred image, i.e., hybrid image 435.

According to an embodiment, at latent extraction phase, image encoder 415 takes a content-style image pair $\{I^1, I^2\}$ and extracts the corresponding latent vector using a CNN-based encoder E. Thus, image encoder 415 generates multi-scale feature maps, i.e., $\{F^{1,l}\}_{l=1}^{L}$ and $\{F^{2,l}\}_{l=1}^{L}$ based on content image 405 and style image 410, respectively. L denotes the number of scales. Image encoder 415 is an example of, or includes aspects of, the corresponding element described with reference to FIGS. 2, 3, and 16.

Latent alignment increases localization of fine-grained textures in the style image. In some cases, the style feature maps are spatially aligned to the content feature maps at each scale l by estimating correspondence between $F^{2,l}$ and $F^{1,l}$. Thus, alignment component 420 computes cosine scores to obtain a similarity matrix $S^l$. The encoded representation F may not be accurate due to noisy scores in the similarity matrix $S^l$ and presence of large intra-class appearance variations. As a result, a soft consistency criterion is applied to $S^l$ such that the correspondences between two pixels are checked forward and backward to determine whether they are consistently correlated.

Alignment component 420 is configured to collect a set of sparse and highly confident correspondences $p^l$ to reduce the effect from noisy correspondences. The alignment from style feature maps to content feature maps is achieved by swapping the pixels only in $p^l$. Alignment component 420 is an example of, or includes aspects of, the corresponding element described with reference to FIGS. 2, 3, and 16. Detail regarding calculating a consistency score and pixel swapping is further described in FIGS. 9 and 10.

At latent decoding phase, image decoder 425 is configured to process rich hierarchical semantics in the associated layer-wise representations. In some examples, image decoder 425 comprises a StyleGAN2 decoder. A GAN is a category of ANN where two neural networks are trained based on a contest with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some examples, a GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network (i.e., to produce novel candidates that the discriminator network classifies as real).

According to an embodiment, a modulation encoder $E_{mod}$ is configured to project feature maps from the latent alignment step to the vectors to modulate layer in image decoder 425, i.e., D. Image decoder 425 is herein denoted as D. In some examples, the encoder for modulation $E_{mod}$ includes a series of 2-strided convolutions with LeakyReLU activations.

Given multi-scale content feature maps and aligned style feature maps $\{F^{1,l}, \tilde{F}^{l}\}_{l=1}^{L}$, image decoder 425 synthesizes a hybrid image through $E_{mod}$ and D. The content feature maps are input to the first n modulation layers of D to preserve the structure from content image 405. The rest layers of D are modulated by the aligned style feature maps to transfer high-fidelity textures from the style image 410. Image decoder 425 generates style-transferred image $I^{2 \to 1}$. Image decoder 425 is an example of, or includes aspects of, the corresponding element described with reference to FIGS. 2, 3, and 16. Modulation encoder 430 is an example of, or includes aspects of, the corresponding element described with reference to FIG. 2. Detail regarding generating hybrid image 435 using image decoder 425 and selecting a layer index of image decoder 425 is further described in FIGS. 11 and 12.

According to an embodiment, the content feature map and style feature map are passed to different layers of image decoder D by changing the layer index n in image decoder D. In some cases, layer index n is controllable by users. For example, the amount of transferred texture can be smoothly controlled by increasing or decreasing n. The structure of the transferred image is determined by the embedded latent of content image 405, i.e., no structural distortion caused by wrong correspondence. Thus, the object structure of content image 405 is maintained in hybrid image 435.

Hybrid image 435 is an example of, or includes aspects of, the corresponding element described with reference to FIGS. 3, 6, and 16. Machine learning model 400 is an example of, or includes aspects of, the corresponding element described with reference to FIGS. 2 and 3.

Appearance Transfer and Image Generation

In FIGS. 5 to 13, a method, apparatus, and non-transitory computer readable medium for image processing are described. One or more embodiments of the method, apparatus, and non-transitory computer readable medium include encoding a content image and a style image using a machine learning model to obtain content features and style features, wherein the content image includes a first object having a first appearance attribute and the style image includes a second object having a second appearance attribute; aligning the content features and the style features to obtain a sparse correspondence map that indicates a correspondence between a sparse set of pixels of the content image and corresponding pixels of the style image; and generating a hybrid image based on the sparse correspondence map, wherein the hybrid image depicts the first object having the second appearance attribute.

Some examples of the method, apparatus, and non-transitory computer readable medium further include generating a first content feature map at a first scale and a second content feature map at a second scale, wherein the content features include the first content feature map and the second content feature map.

Some examples of the method, apparatus, and non-transitory computer readable medium further include generating a first style feature map at a first scale and a second style feature map at a second scale, wherein the style features include the first style feature map and the second style feature map.

Some examples of the method, apparatus, and non-transitory computer readable medium further include computing a pixel-wise similarity score between a pixel from the content image and a pixel from the style image based on the content features and the style features. Some examples further include including the pixel from the content image in the sparse set of pixels of the content image based on the pixel-wise similarity score.

Some examples of the method, apparatus, and non-transitory computer readable medium further include computing a first maximum pixel-wise similarity score for the pixel from the content image. Some examples further include computing a second maximum pixel-wise similarity score for the pixel from the style image. Some examples further include computing a consistency score based on the first maximum pixel-wise similarity score and the second maximum pixel-wise similarity score, wherein the pixel from the content image is included in the sparse set of pixels of the content image based on the consistency score.

Some examples of the method, apparatus, and non-transitory computer readable medium further include identifying a layer index for a decoder of the machine learning model. Some examples further include providing the content features as a first input to at least one layer of the decoder having a first index that is less than the layer index. Some examples further include combining the sparse correspondence map with the style features to obtain aligned style features. Some examples further include providing the aligned style features as a second input to at least one subsequent layer of the decoder having a second index that is greater than the layer index, wherein the hybrid image comprises an output of the decoder.

Some examples of the method, apparatus, and non-transitory computer readable medium further include determining a desired level of detail to be transferred from the style image to the content image. Some examples further include selecting the layer index based on the desired level of detail.

Some examples of the method, apparatus, and non-transitory computer readable medium further include determining that the second object corresponds to the first object, wherein the alignment is based on the determination.

Some examples of the method, apparatus, and non-transitory computer readable medium further include identifying a first plurality of objects in the content image. Some examples further include identifying a second plurality of objects in the style image. Some examples further include mapping the first plurality of objects to the second plurality of objects, wherein the alignment is based on the mapping. In some examples, the second appearance attribute comprises color information, texture information, or a combination thereof.

Figure 5:
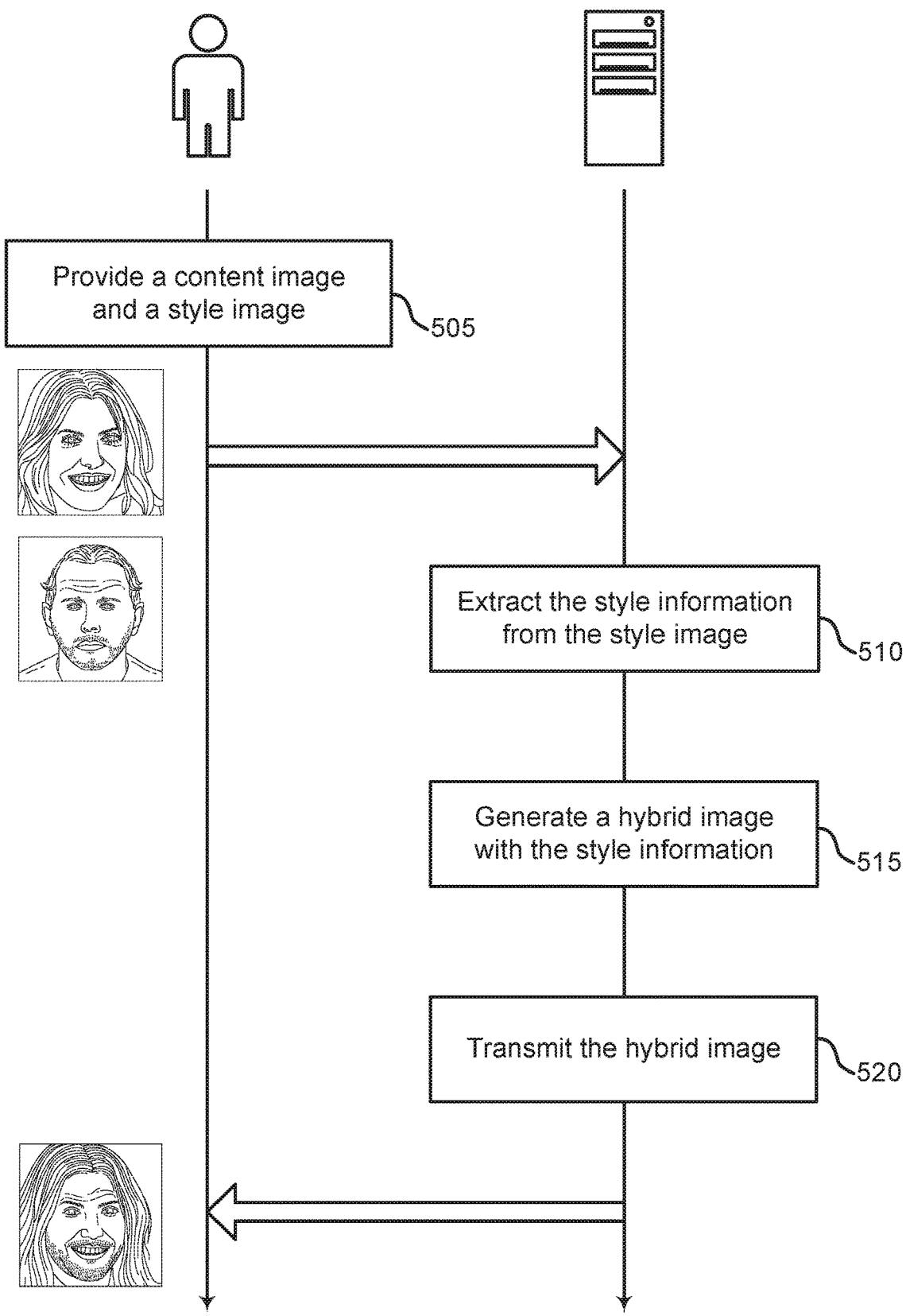
FIG. 5 shows an example of image generation application according to aspects of the present disclosure.

FIG. 5 shows an example of image generation application according to aspects of the present disclosure. Image processing apparatus 200 as described in FIGS. 1 and 2 is used herein to perform appearance transfer and image generation. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system provides a content image and a style image. In some cases, the operations of this step refer to, or may be performed by, a user as described with reference to FIG. 1. In some examples, a content image and a style image are stored in a database (e.g., database 120) for retrieval by the user. As an example illustrated herein, the content image (the image above) shows a female and her face. The style image (the image below) shows a male and his face.

At operation 510, the system extracts the style information from the style image. In some cases, the operations of this step refer to, or may be performed by, an image processing apparatus as described with reference to FIGS. 1 and 2.

At operation 515, the system generates a hybrid image with the style information. In some cases, the operations of this step refer to, or may be performed by, an image processing apparatus as described with reference to FIGS. 1 and 2. As an example shown herein, the hybrid image shows a person's face that has substantially similar appearance as the style image (i.e., the face of a male). The hybrid image includes substantially similar facial features or facial appearances as those in the style image such as wrinkles, eye lashes, beard, etc. That is, the object in the hybrid image looks quite similar to the style image while the object structure and spatial arrangement is maintained as in the content image.

At operation 520, the system transmits the hybrid image. In some cases, the operations of this step refer to, or may be performed by, an image processing apparatus as described with reference to FIGS. 1 and 2. In some examples, the image processing apparatus returns the hybrid image to the user for subsequent editing.

Figure 6:
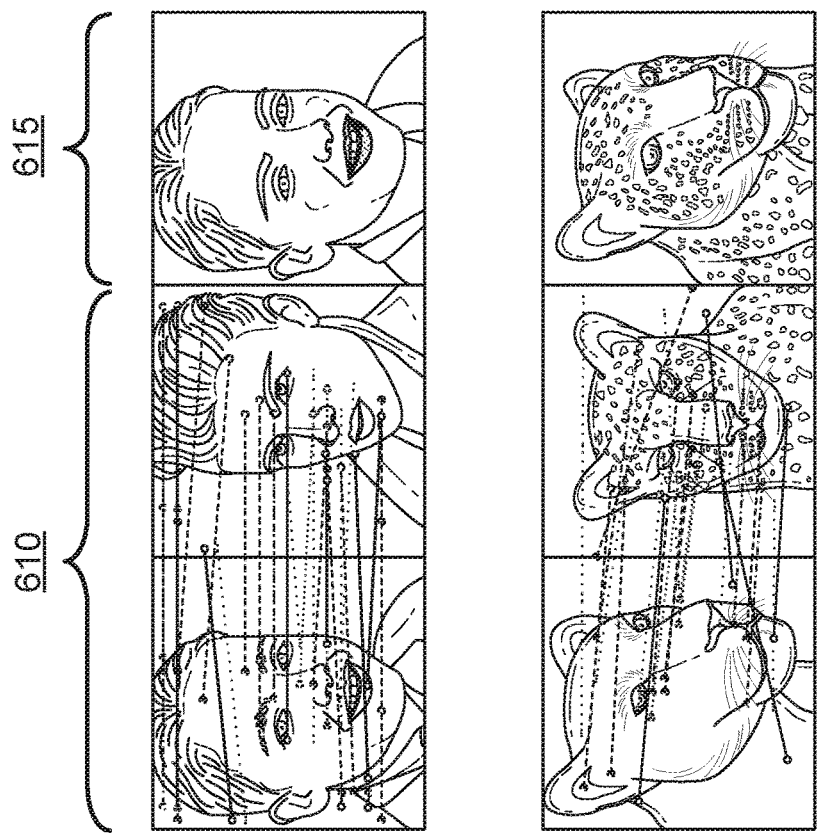
FIG. 6 shows an example of a pair of input images and generated hybrid image according to aspects of the present disclosure.
Figure 6:
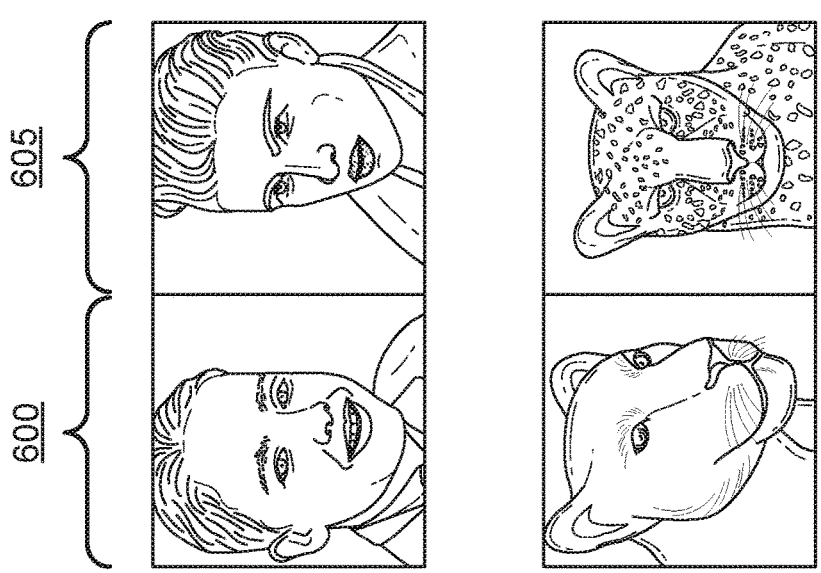

FIG. 6 shows an example of a pair of input images (e.g., content image 600, style image 605) and generated hybrid image 615 according to aspects of the present disclosure. The pair of input images are input to machine learning model 225 as described in FIGS. 2 to 4. Hybrid image 615 is an output image from machine learning model 225. The example shown includes content image 600, style image 605, correspondence map 610, and hybrid image 615. In FIG. 6, the upper row of images indicates an example of human appearance transfer. The bottom row of images indicates an example of animal appearance transfer.

Driven by correspondences estimated between content image 600 and style image 605, the machine learning model obtains more accurate transfer of fine-grained texture and object appearance, while preserving object structure from content image 600. As shown in FIG. 6, hybrid image 615 indicates rich texture transfer (e.g., appearances, attributes, texture, facial features) while preserving the spatial structure of objects in the content image at the same time. For example, hybrid image 615 on the top row shows a young man's face. Hybrid image 615 on the top row shows substantial similar facial appearances (e.g., eyebrow, hairstyle, lips, cheeks) as those in the corresponding style image 605. Hybrid image 615 on the bottom row shows a leopard's face. Hybrid image 615 on the bottom row shows substantial similar facial appearances (e.g., stripes on face) as those in the corresponding style image 605. Note object structure and spatial arrangement from content image 600 is preserved in hybrid image 615.

Content image 600 is an example of, or includes aspects of, the corresponding element described with reference to FIGS. 3, 4, 13, 15, and 16. Style image 605 is an example of, or includes aspects of, the corresponding element described with reference to FIGS. 3, 4, 13, 15, and 16. Correspondence map 610 is an example of, or includes aspects of, the corresponding element described with reference to FIG. 13. Hybrid image 615 is an example of, or includes aspects of, the corresponding element described with reference to FIGS. 3, 4, and 16.

Figure 7:
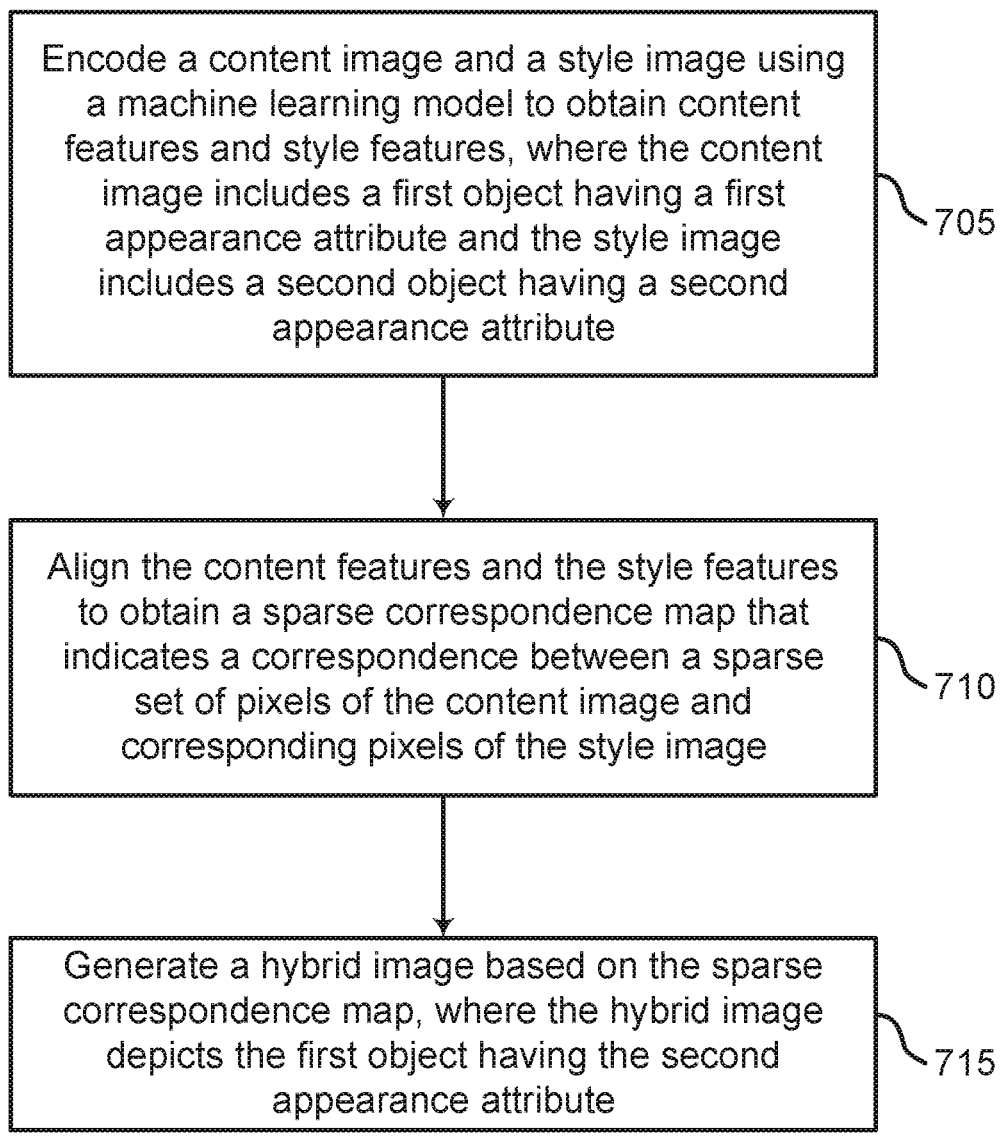
FIG. 7 shows an example of a method for image processing according to aspects of the present disclosure.

FIG. 7 shows an example of a method for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system encodes a content image and a style image using a machine learning model to obtain content features and style features, where the content image includes a first object having a first appearance attribute and the style image includes a second object having a second appearance attribute. In some cases, the operations of this step refer to, or may be performed by, an image encoder as described with reference to FIGS. 2-4, and 16.

At operation 710, the system aligns the content features and the style features to obtain a sparse correspondence map that indicates a correspondence between a sparse set of pixels of the content image and corresponding pixels of the style image. In some cases, the operations of this step are further described in FIGS. 9 and 10. Constructing a sparse correspondence map is further described with reference to FIG. 9. Calculating a consistency score for selection of a sparse set of pixels is further described with reference to FIG. 10. The operations of this step refer to, or may be performed by, an alignment component as described with reference to FIGS. 2-4, and 16.

According to some embodiments of the present disclosure, the image encoder is configured to extract multi-scale features. The alignment component then extracts the correspondences for robust style transfer with aligned texture maps. Multi-scale features from the content image are referred to as structure features or content features.

According to an embodiment, alignment component (for latent alignment) is configured to increase localization of fine-grained textures from the style image. In some cases, the style feature maps are spatially aligned to the content feature maps at each scale l by estimating correspondence between style features and content features at scale l (i.e., between $F^{2,l}$ and $F^{1,l}$). The encoded representation F may not be accurate due to noisy scores in the similarity matrix $S^l$ and presence of large intra-class appearance variations. Alignment component applies a soft consistency check to $S^l$ such that the correspondences between two pixels are checked forward and backward to determine whether they are consistently correlated. A set of sparse and highly confident correspondences are collected based on a similarity score incorporating soft consistency to reduce the effect from noisy correspondences.

According to some embodiments, the content features are fed to high-level layers of the image decoder. Multi-scale features from the style image are aligned to obtain aligned texture features, which are input to low-level layers of the image decoder. In some cases, the low-level layers of the image decoder fine-grained textures without distorting the spatial structure from the content image.

At operation 715, the system generates a hybrid image based on the sparse correspondence map, where the hybrid image depicts the first object having the second appearance attribute. In some examples, a hybrid image incorporates appearance features and style information from the style image while the hybrid image preserves object structure as in the content image. In some cases, the operations of this step are further described in FIGS. 11 and 12. The operations of this step refer to, or may be performed by, an image decoder as described with reference to FIGS. 2-4, and 16.

Figure 8:
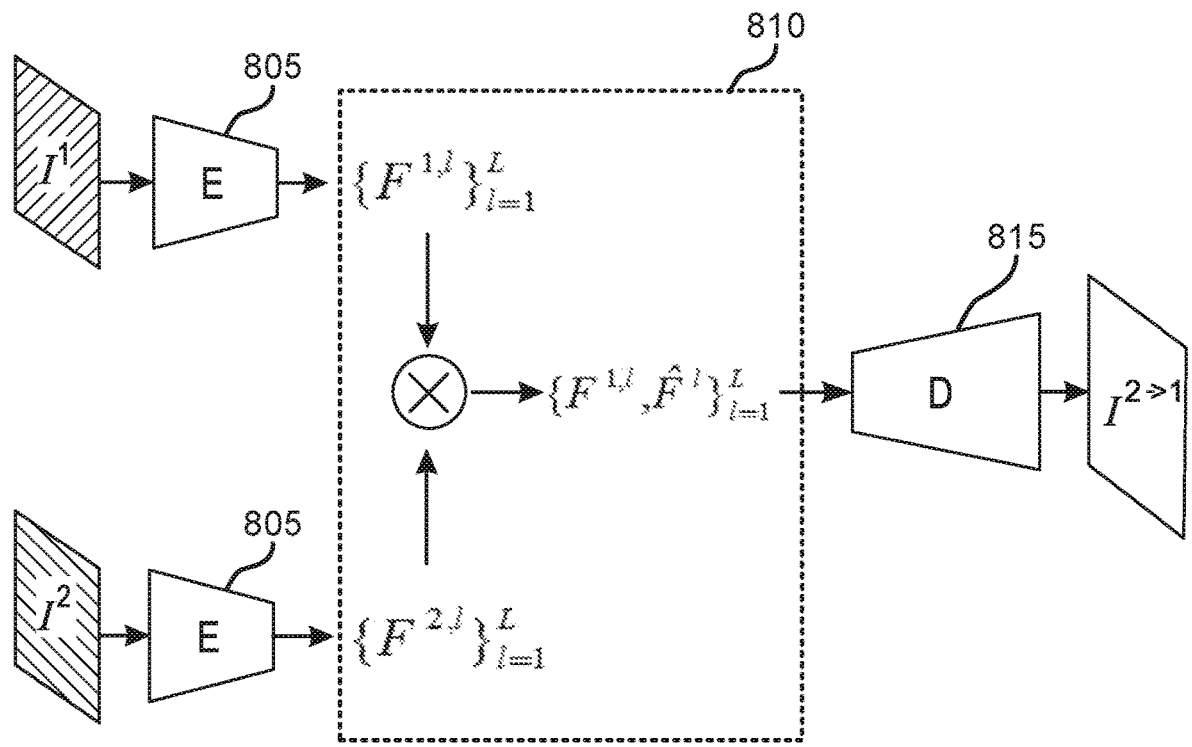
FIG. 8 shows an example of a method for generating a hybrid image according to aspects of the present disclosure.

FIG. 8 shows an example of a method for generating a hybrid image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system encodes a content image and a style image to obtain content features and style features, respectively. In some cases, the operations of this step refer to, or may be performed by, an image encoder as described with reference to FIGS. 2-4, and 16. In some cases, operation 805 refers to the latent extraction stage as illustrated in FIG. 4. The image encoder takes a content-style image pair $\{I^1, I^2\}$ and extracts the corresponding latent vectors or latent codes using a CNN-based encoder E. $I^1$ is a content image and $I^2$ is a style image. The image encoder generates multi-scale feature maps, $\{F^{1,l}\}_{l=1}^L$ and $\{F^{2,l}\}_{l=1}^L$ based on the content image and style image, respectively. L denotes the number of scales. E denotes the image encoder.

At operation 810, the system aligns content features and style features. In some cases, the operations of this step refer to, or may be performed by, an alignment component as described with reference to FIGS. 2-4, and 16. In some cases, operation 810 refers to the latent alignment stage as illustrated in FIG. 4. Latent alignment increases localization of fine-grained textures in the style image. In some cases, the style feature maps are spatially aligned to the content feature maps at each scale l by estimating correspondence between $F^{2,l}$ and $F^{1,l}$. Detail regarding latent alignment is further described in FIG. 4.

At operation 815, the system generates a hybrid image. In some cases, the operations of this step refer to, or may be performed by, an image decoder as described with reference to FIGS. 2-4, and 16. In some cases, operation 815 refers to the latent decoding stage as illustrated in FIG. 4. The image decoder is configured to perform latent decoding using rich hierarchical semantics in the associated layer-wise representations. In some examples, the image decoder comprises a StyleGAN2 decoder.

Figure 9:
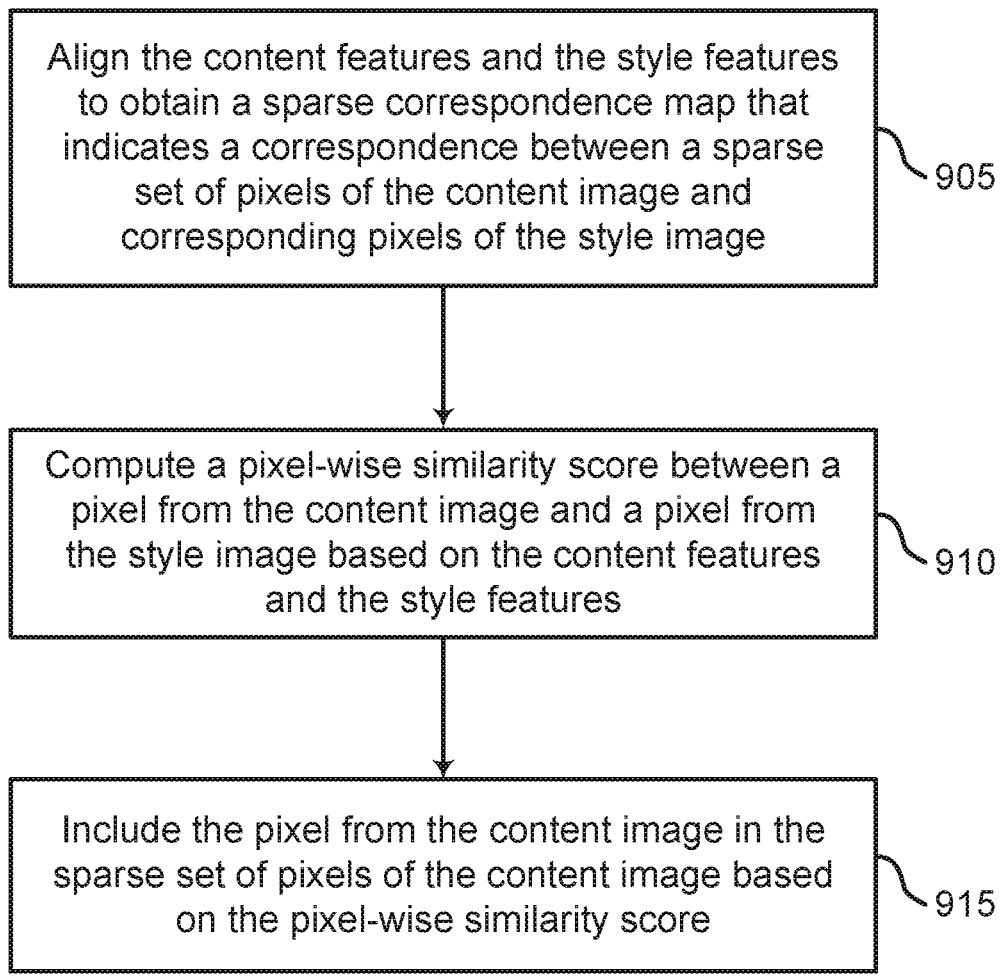
FIG. 9 shows an example of a method for constructing a sparse correspondence map according to aspects of the present disclosure.

FIG. 9 shows an example of a method for constructing a sparse correspondence map according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system aligns the content features and the style features to obtain a sparse correspondence map that indicates a correspondence between a sparse set of pixels of the content image and corresponding pixels of the style image. In some cases, the operations of this step refer to, or may be performed by, an alignment component as described with reference to FIGS. 2-4, and 16.

Latent alignment increases localization of fine-grained textures in the style image. In some cases, the style feature maps are spatially aligned to the content feature maps at each scale l by estimating correspondence between $F^{2,l}$ and $F^{1,l}$. Thus, an alignment component computes cosine scores to obtain a similarity matrix $S^l$. The encoded representation F may not be accurate due to noisy scores in the similarity matrix $S^l$ and presence of large intra-class appearance variations. As a result, a soft consistency criterion is applied to the similarity matrix $S^l$ such that the correspondences between two pixels are checked forward and backward to determine whether they are consistently correlated. Computing the consistency score will be described in FIG. 10.

At operation 910, the system computes a pixel-wise similarity score between a pixel from the content image and a pixel from the style image based on the content features and the style features. In some cases, the operations of this step refer to, or may be performed by, an alignment component as described with reference to FIGS. 2-4, and 16.

In some embodiments, the content image and style image are aligned by correspondence followed by generating the transferred image to obtain precise transfer of local textures. The machine learning model extracts the latent maps $\{F^1, F^2\} \in \mathbb{R}^{h \times w \times d}$ through an image encoder E, where h, w, and d denote the spatial resolution and channel dimension. The pixel-wise similarity score is computed as a cosine distance:

$$S_{i,j} = \frac{F_i^1 \cdot F_j^2}{\|F_i^1\| \cdot \|F_j^2\|}, \; S \in \mathbb{R}^{(h \times w) \times (h \times w)} \quad (1)$$

where i denotes each pixel on the latent maps. A correspondence map is estimated by applying sparse cross-domain and semantic correspondence to the similarity matrix to align style and content images. In some cases, methods described herein are used to localize detailed textures.

At operation 915, the system includes the pixel from the content image in the sparse set of pixels of the content image based on the pixel-wise similarity score. In some cases, the operations of this step refer to, or may be performed by, an alignment component as described with reference to FIGS. 2-4, and 16.

Figure 10:
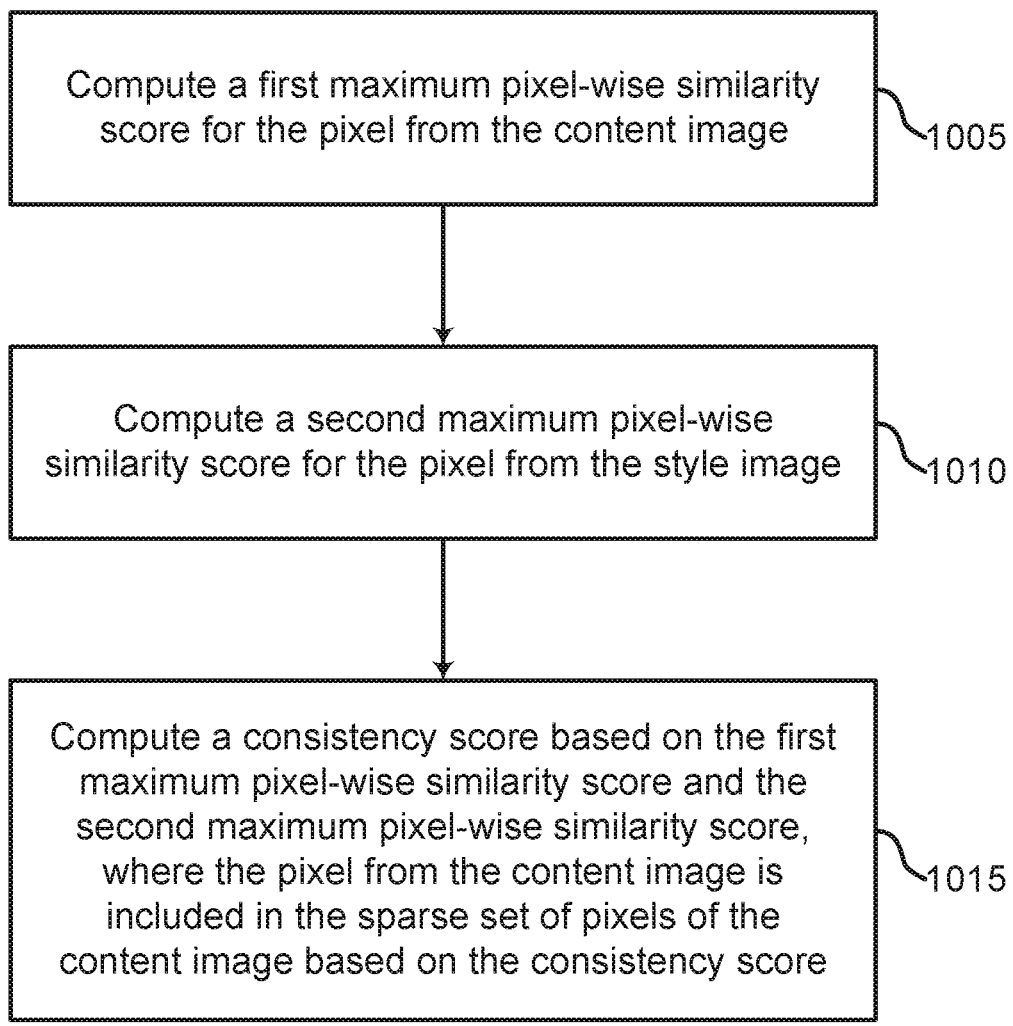
FIG. 10 shows an example of a method for constructing a sparse correspondence map based on a consistency score according to aspects of the present disclosure.

FIG. 10 shows an example of a method for constructing a sparse correspondence map based on a consistency score according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system computes a first maximum pixel-wise similarity score for the pixel from the content image. In some cases, the operations of this step refer to, or may be performed by, an alignment component as described with reference to FIGS. 2-4, and 16. The pixel-wise similarity score is computed as a cosine distance as illustrated in FIG. 9. In some examples, a first maximum pixel-wise similarity score for the pixel from the content image is formulated as $\max_i S_{i,j}^l$.

At operation 1010, the system computes a second maximum pixel-wise similarity score for the pixel from the style image. In some cases, the operations of this step refer to, or may be performed by, an alignment component as described with reference to FIGS. 2-4, and 16. In some examples, a second maximum pixel-wise similarity score for the pixel from the style image is formulated as $\max_j S_{i,j}^l$.

At operation 1015, the system computes a consistency score based on the first maximum pixel-wise similarity score and the second maximum pixel-wise similarity score, where the pixel from the content image is included in the sparse set of pixels of the content image based on the consistency score. In some cases, the operations of this step refer to, or may be performed by, an alignment component as described with reference to FIGS. 2-4, and 16. The similarity score incorporating soft consistency can be expressed as the following:

$$Q_{i,j}^l = \frac{(S_{i,j}^l)^2}{\max_i S_{i,j}^l \cdot \max_j S_{i,j}^l} \quad (2)$$

where $S_{i,j}^l$ indicates the score on the l-th scale between the i-th pixel from $I^1$ and j-th pixel from $I^2$. The $Q_{i,j}^l$ equals 1 if and only if the match between i and j satisfies the forward-backward consistency constraint, and $Q_{i,j}^l$ is less than 1 otherwise. The alignment component is configured to collect a set of sparse and highly confident correspondences to reduce the effect from noisy correspondences $p^l = \{(i,j) | Q_{i,j}^l = 1\}$.

According to an embodiment, the alignment from style feature maps to content feature maps is obtained by swapping the pixels only in $p^l$:

$$\hat{F}_i^l = \begin{cases} F_1^{2,l}, & \text{if } (i,j) \in p^l \\ F_i^{1,l}, & \text{otherwise} \end{cases} \quad (3)$$

where $\hat{F}^l$ denotes the aligned style feature map at the l-th scale. The aligned multi-scale feature maps are able to capture and transfer fine-grained details with high spatial and visual accuracy.

Figure 11:
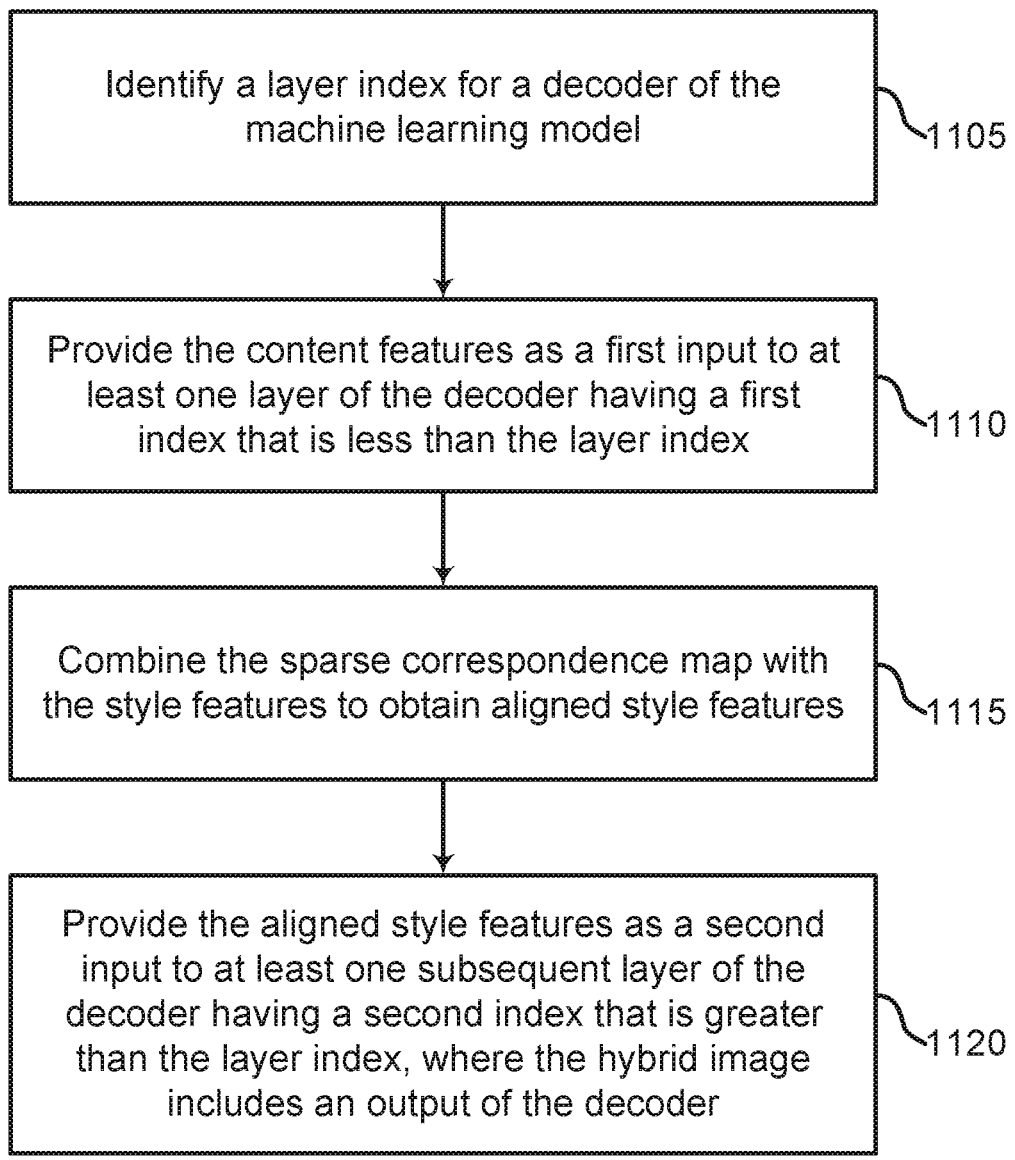
FIG. 11 shows an example of a method for generating aligned style features as input for decoding according to aspects of the present disclosure.

FIG. 11 shows an example of a method for generating aligned style features as input for decoding according to aspects of the present disclosure. Selecting a layer index for a decoder will be described in greater detail in FIG. 12. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system identifies a layer index for a decoder of the machine learning model. In some cases, the operations of this step refer to, or may be performed by, a machine learning model as described with reference to FIGS. 2-4. Latent decoding is conducted with StyleGAN2 decoder using rich hierarchical semantics in the associated layer-wise representations. Identifying a layer index is illustrated in greater detail in FIG. 12.

At operation 1110, the system provides the content features as a first input to at least one layer of the decoder having a first index that is less than the layer index. In some cases, the operations of this step refer to, or may be performed by, a machine learning model as described with reference to FIGS. 2-4.

A modulation encoder $E_{mod}$ is configured to project feature maps from the latent alignment step to the vectors to modulate layer in image decoder D. Given multi-scale content feature maps and aligned style feature maps $\{F_{1,l}, \hat{F}^l\}_{l=1}^L$, the machine learning model synthesizes a hybrid image through $E_{mod}$ and image decoder D. The content feature maps are input to the first n modulation layers of D to preserve the structure from the content image. Users can adjust the size of n to manage the extent of texture transfer from the style image to the content image.

At operation 1115, the system combines the sparse correspondence map with the style features to obtain aligned style features. In some cases, the operations of this step refer to, or may be performed by, an alignment component as described with reference to FIGS. 2-4, and 16.

At operation 1120, the system provides the aligned style features as a second input to at least one subsequent layer of the decoder having a second index that is greater than the layer index, where the hybrid image includes an output of the decoder. In some cases, the operations of this step refer to, or may be performed by, a machine learning model as described with reference to FIGS. 2-4. The rest layers of image decoder D are modulated by the aligned style feature maps to transfer high-fidelity textures from the style image. The style-transferred image $I^{2 \to 1}$ is obtained by:

$$I^{2 \to 1} = D(E_{mod}(\{F^{1,l}, \hat{F}^l\}_{l=1}^L)) \quad (4)$$

The content feature map and style feature map are passed to different layers of image decoder D by changing the layer index n in decoder D. For example, the amount of transferred texture can be smoothly controlled by increasing n. The structure of the transferred image is determined by the embedded latent of the content image, i.e., no structural distortion caused by wrong correspondence. Thus, the original object structure from the content image is maintained.

Figure 12:
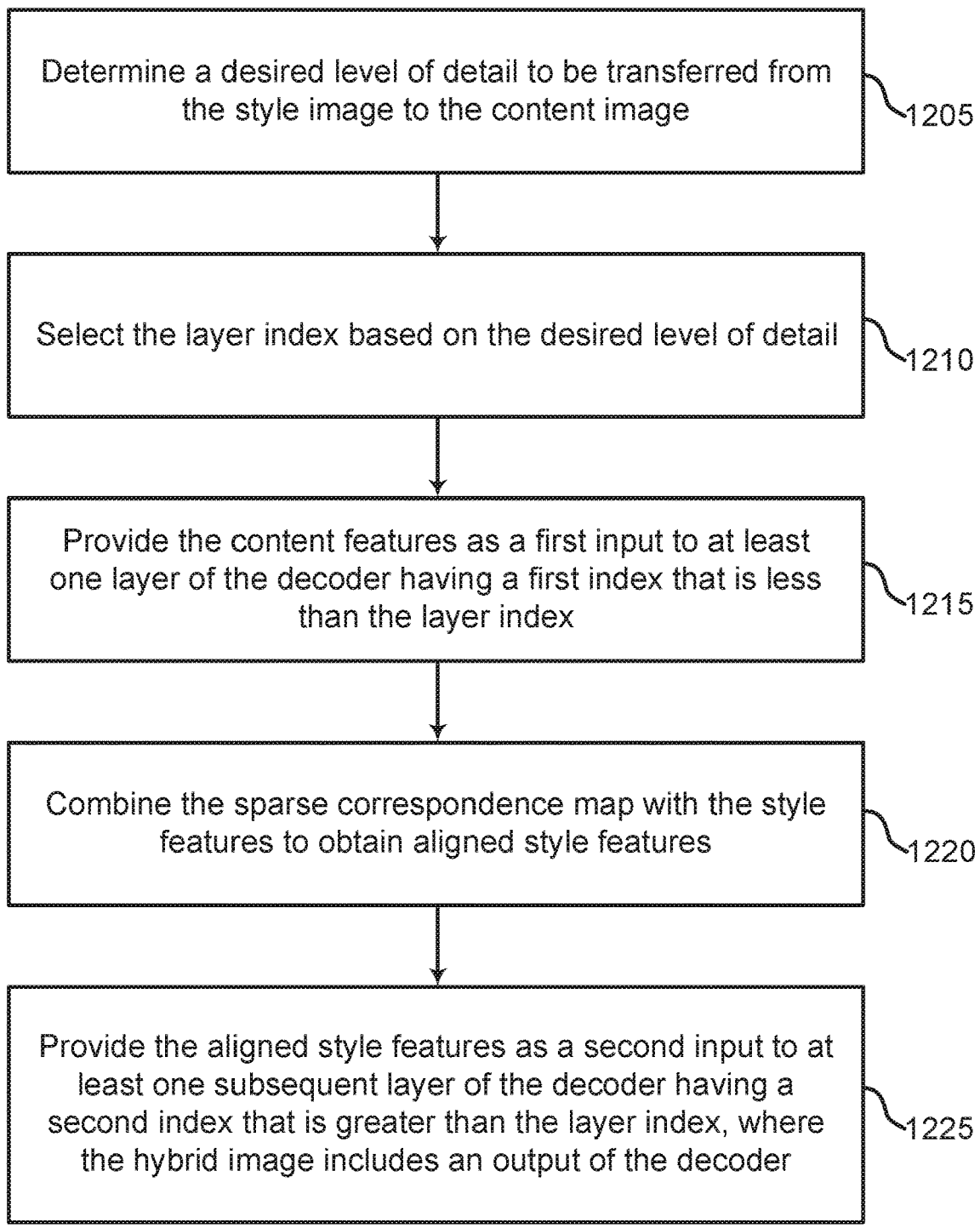
FIG. 12 shows an example of a method for selecting a layer index based on a desired level of detail according to aspects of the present disclosure.

FIG. 12 shows an example of a method for selecting a layer index based on a desired level of detail according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system determines a desired level of detail to be transferred from the style image to the content image. In some cases, the operations of this step refer to, or may be performed by, a machine learning model as described with reference to FIGS. 2-4. In some examples, user 100 (see FIG. 1) determines a desired level of detail and selects the layer index based on the desired level of detail.

At operation 1210, the system selects the layer index based on the desired level of detail. In some cases, the operations of this step refer to, or may be performed by, a machine learning model as described with reference to FIGS. 2-4.

At operation 1215, the system provides the content features as a first input to at least one layer of the decoder having a first index that is less than the layer index. In some cases, the operations of this step refer to, or may be performed by, a machine learning model as described with reference to FIGS. 2-4.

At operation 1220, the system combines the sparse correspondence map with the style features to obtain aligned style features. In some cases, the operations of this step refer to, or may be performed by, an alignment component as described with reference to FIGS. 2-4, and 16.

At operation 1225, the system provides the aligned style features as a second input to at least one subsequent layer of the decoder having a second index that is greater than the layer index, where the hybrid image includes an output of the decoder. In some cases, the operations of this step refer to, or may be performed by, a machine learning model as described with reference to FIGS. 2-4.

Figure 13:
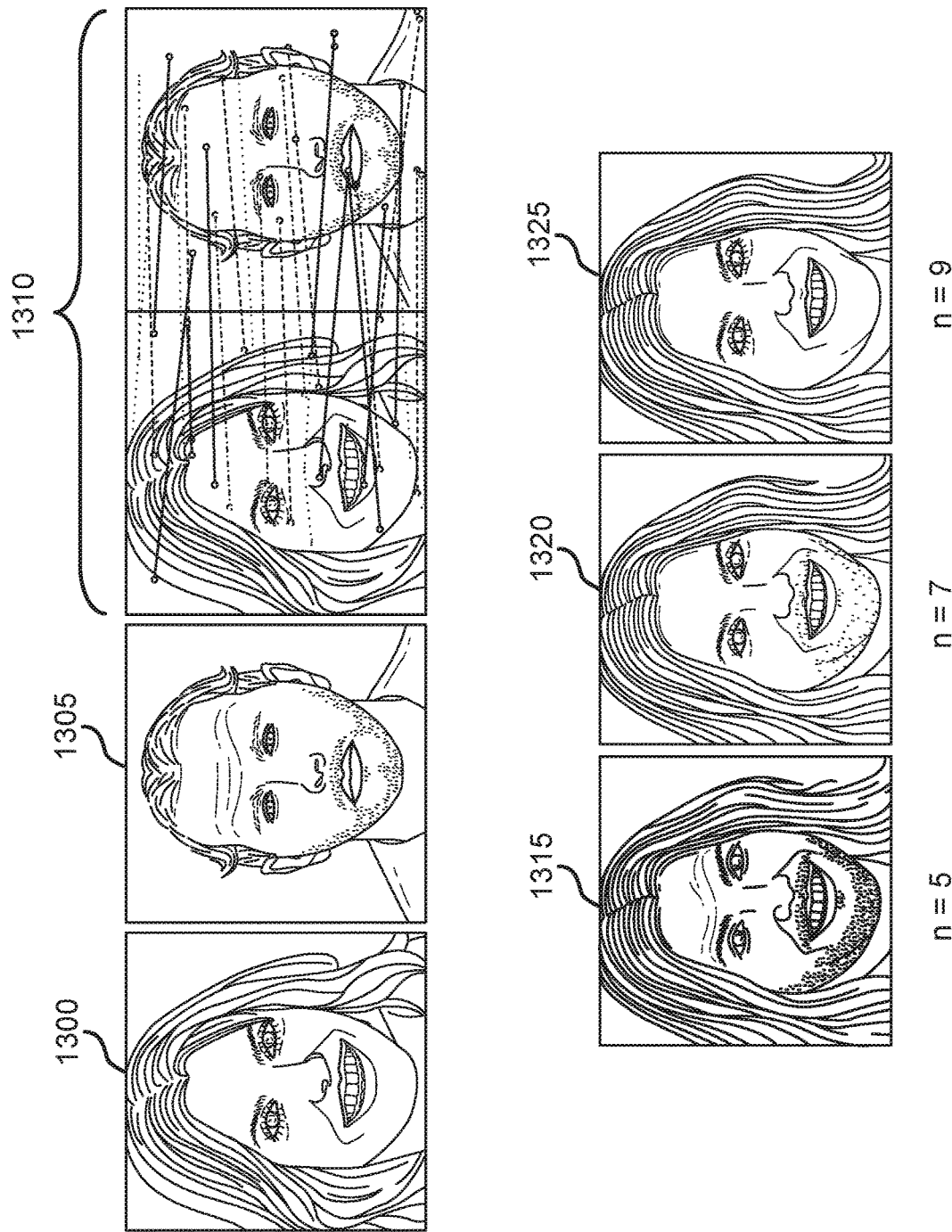
FIG. 13 shows an example of alternative layer index selections according to aspects of the present disclosure.

FIG. 13 shows an example of alternative layer index selections according to aspects of the present disclosure. The example shown includes content image 1300, style image 1305, correspondence map 1310, first layer index 1315, second layer index 1320, and third layer index 1325. FIG. 13 shows visualization of texture control by manipulating the layer index n in image decoder D. A smaller n results in more aggressive texture transfer since richer textural information is passed to the decoder for image generation. In some examples, first layer index 1315 is n=5, second layer index 1320 is n=7, and third layer index 1325 is n=9, respectively. The bottom row of images shows appearance-transferred images corresponding to different layer index n. As illustrated herein, when n is a smaller, the generated image incorporates relatively more appearances from style image 1305. That is, facial appearances of the generated image indicated by first layer index 1315 looks substantially similar to style image 1305 (i.e., face of a male). When n is a larger, the generated image incorporates relatively few appearances from style image 1305. That is, facial appearances of the generated image indicated by third layer index 1325 looks similar to content image 1300.

In some examples, image encoder E includes feature pyramid network (FPN)-based architecture, and image decoder D includes a StyleGAN2 model. For example, the input images are resized to 256×256 before being input to the image encoder. The latent maps can be sampled to multiple scales, i.e., 64×64, 32×32, and 16×16. In some examples, with regards to input indices of the modulation layers in image decoder D, 16×16 latent maps are provided to the layers indexing from 1 to 3, 32×32 maps to layers from 4 to 7, and 64×64 maps to layers from 8 to the last (e.g., the 18th layer is the output layer with the scale of 1024× 1024). With regards to the image generation, the original style latent codes are input to layers indexing from 10 to the last in image decoder D. Therefore, n is set between 1 and 9 to control or manage texture transfer. In some example experiments, n=8 means that the content latent codes are provided to the modulation layers indexing from 1 to 7, and the aligned style latent codes are fed to layers from 8 to 9. The temperature $\tau$=0.03 and the threshold $\gamma$=256.

Correspondence map 1310 shows correspondences at l=2. Correspondence map 1310 is an example of, or includes aspects of, the corresponding element described with reference to FIG. 6.

Content image 1300 is an example of, or includes aspects of, the corresponding element described with reference to FIGS. 3, 4, 6, 15, and 16. Style image 1305 is an example of, or includes aspects of, the corresponding element described with reference to FIGS. 3, 4, 6, 15, and 16.

Training and Evaluation

Figure 14:
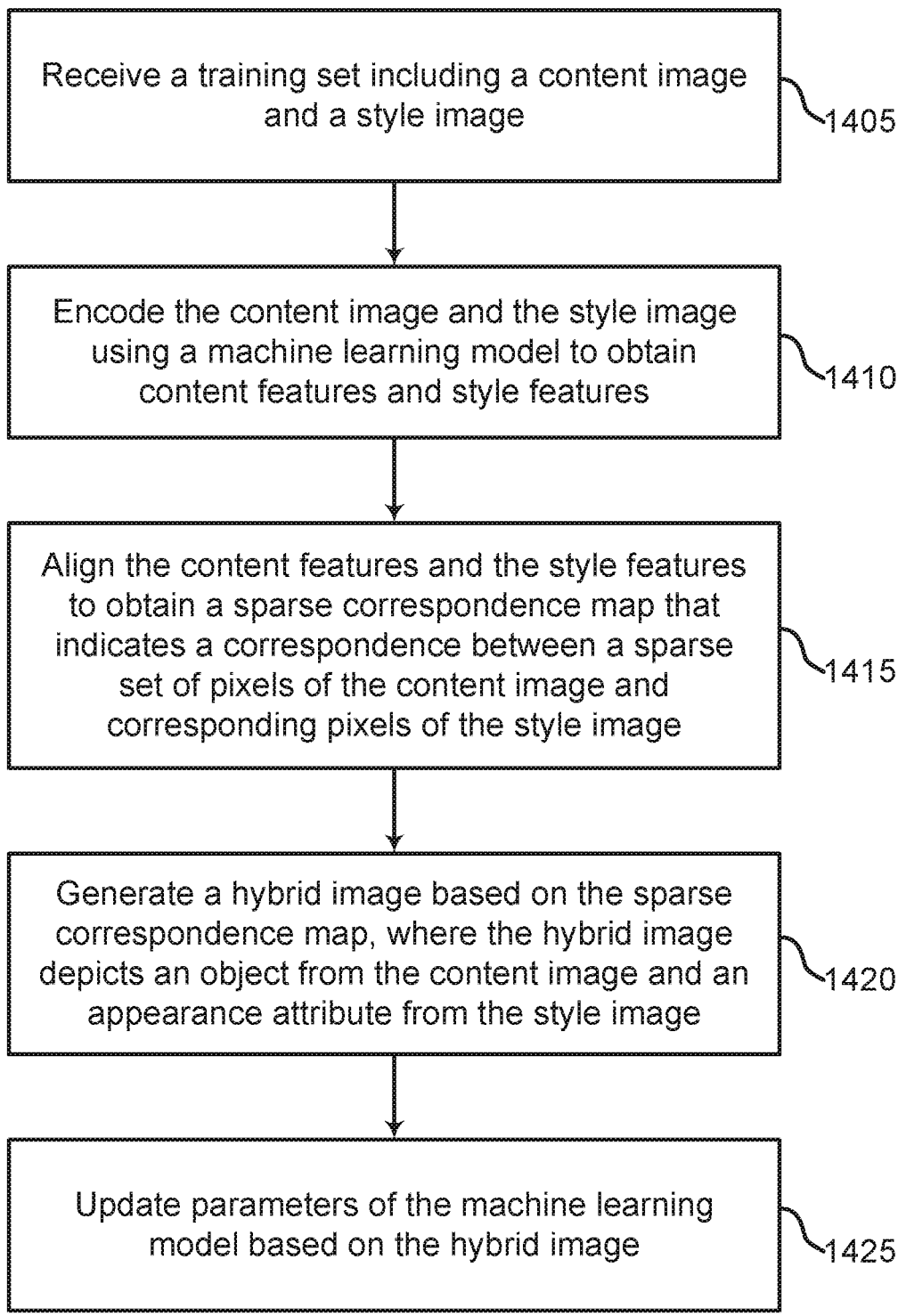
FIG. 14 shows an example of a method for training a machine learning model according to aspects of the present disclosure.
Figure 15:
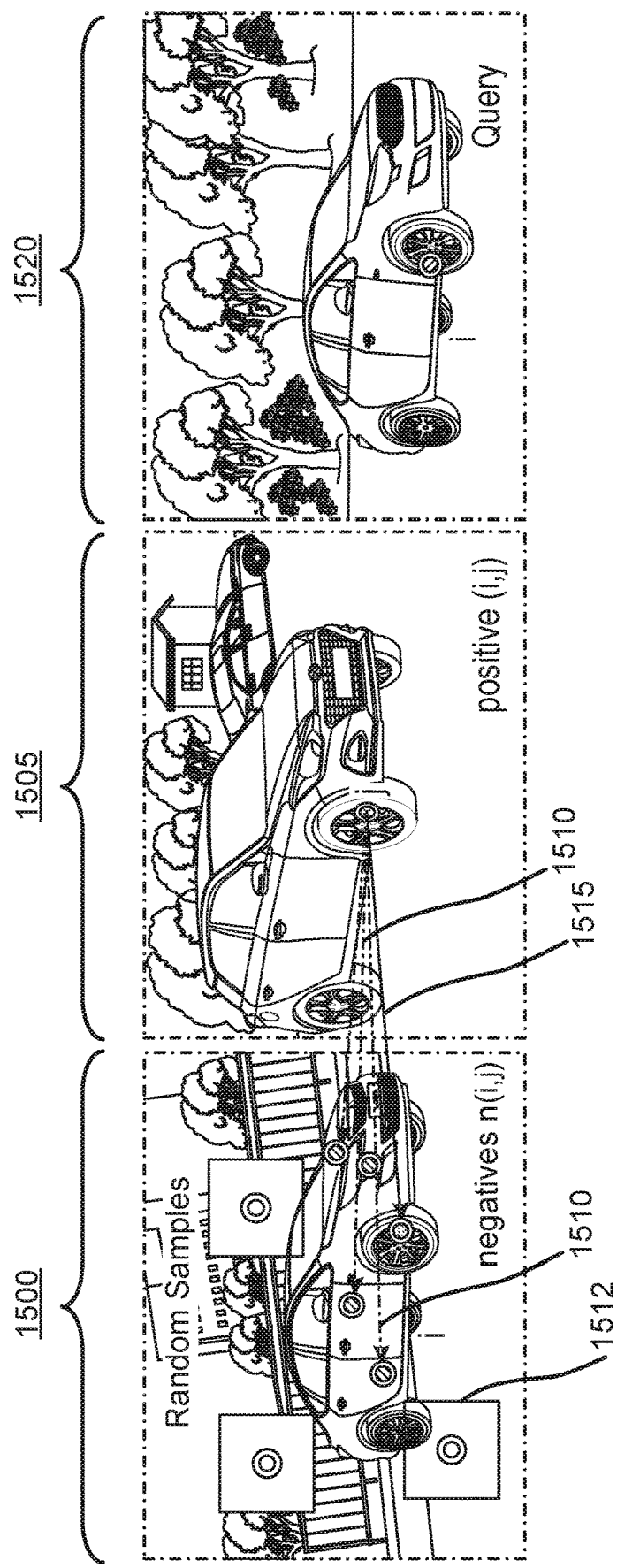
FIG. 15 shows an example of training a machine learning model based on a correspondence contrastive loss according to aspects of the present disclosure.
Figure 16:
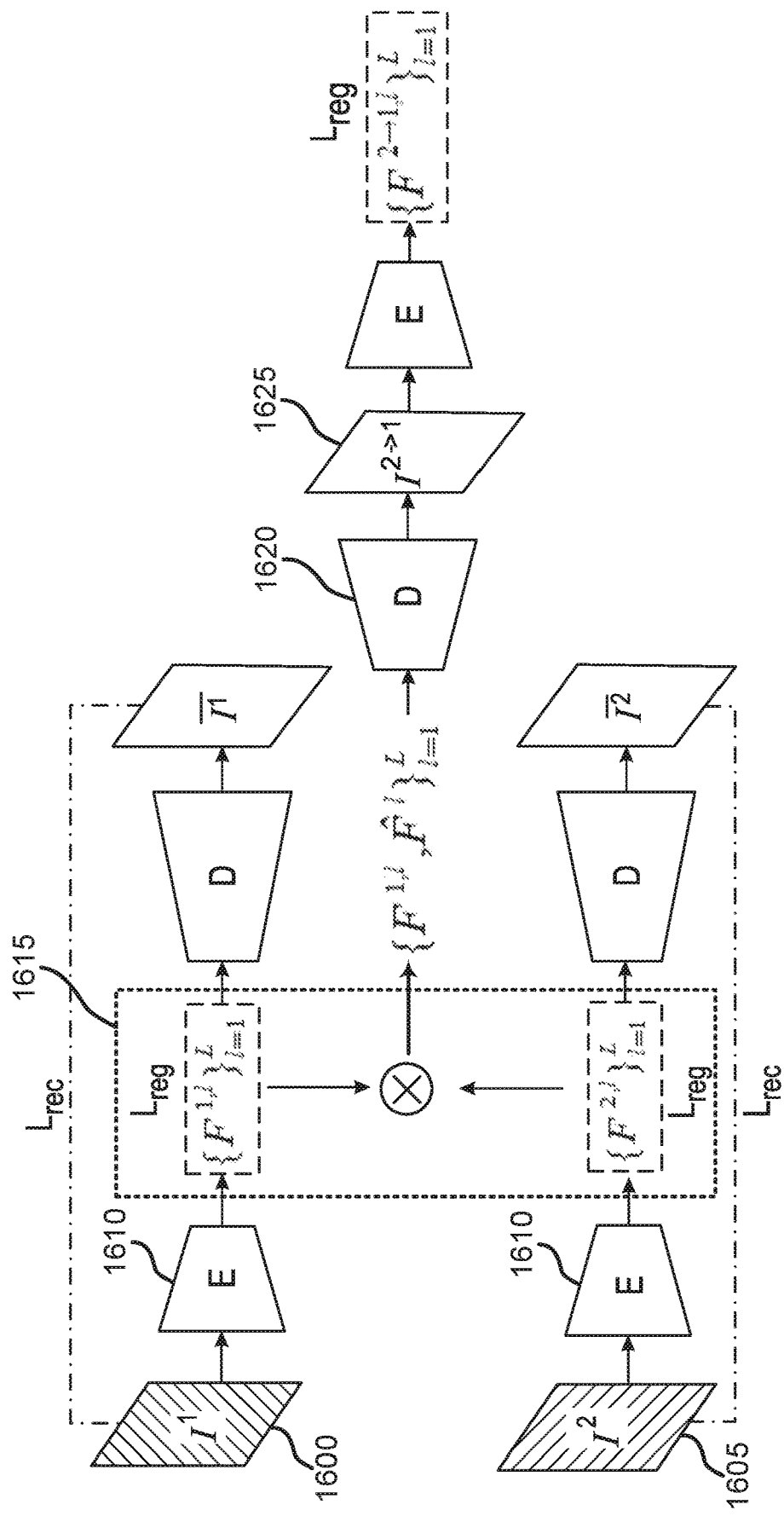
FIG. 16 shows an example of a method for training a machine learning model based on a reconstruction loss and a regularization loss according to aspects of the present disclosure.

In FIGS. 14-16, a method, apparatus, and non-transitory computer readable medium for training a machine learning model are described. One or more embodiments of the method, apparatus, and non-transitory computer readable medium include receiving a training set including a content image and a style image; encoding the content image and the style image using a machine learning model to obtain content features and style features; aligning the content features and the style features to obtain a sparse correspondence map that indicates a correspondence between a sparse set of pixels of the content image and corresponding pixels of the style image; generating a hybrid image based on the sparse correspondence map, wherein the hybrid image depicts an object from the content image and an appearance attribute from the style image; and updating parameters of the machine learning model based on the hybrid image.

Some examples of the method, apparatus, and non-transitory computer readable medium further include computing a pixel-wise similarity score between a pixel from the content image and a pixel from the style image based on the content features and the style features. Some examples further include including the pixel from the content image in the sparse set of pixels of the content image based on the pixel-wise similarity score.

Some examples of the method, apparatus, and non-transitory computer readable medium further include generating a negative sample pair by randomly cropping the content image. Some examples further include generating a positive sample pair by cropping the content image based on the pixel-wise similarity score. Some examples further include computing a correspondence contrastive loss based on the negative sample pair and the positive sample pair, wherein the parameters of the machine learning model are updated based on the correspondence contrastive loss.

Some examples of the method, apparatus, and non-transitory computer readable medium further include encoding the hybrid image to obtain hybrid features. Some examples further include computing a regularization loss based on the content features, the style features, and the hybrid features, wherein the parameters of the machine learning model are updated based on the regularization loss.

Some examples of the method, apparatus, and non-transitory computer readable medium further include generating a reconstructed content image based on the content features. Some examples further include computing a reconstruction loss based on the content image and the reconstructed content image, wherein the parameters of the machine learning model are updated based on the reconstruction loss.

Some examples of the method, apparatus, and non-transitory computer readable medium further include generating a reconstructed style image based on the style features, wherein the reconstruction loss is computed based on the style image and the reconstructed style image.

FIG. 14 shows an example of a method for training a machine learning model according to aspects of the present disclosure. Training component 220 of FIG. 2 is used to train a machine learning model. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to some embodiments of the present disclosure, the machine learning model is trained using contrastive learning. Contrastive learning refers to a type of machine learning in which a model is trained using the selection of positive and negative sample pairs. Contrastive learning can be used in either a supervised or unsupervised (e.g., self-supervised) training context. A loss function for a contrastive learning model can encourage a model to generate similar results for positive sample pairs, and dissimilar results for negative sample pairs. In self-supervised examples, positive samples can be generated automatically from input data (e.g., by cropping or transforming an existing image).

At operation 1405, the system receives a training set including a content image and a style image. In some cases, the operations of this step refer to, or may be performed by, a training component as described with reference to FIG. 2. In one example, a training set involves four different datasets. First, training data on human face. All 70,000 images from the FFHQ dataset are used. For evaluations, the standard test split of the CelebA-HQ dataset can be used (2,824 test images). The image decoder outputs 1024×1024 resolution image for human face category.

Second, training data on animal face. The standard train-test split of the AFHQ wild dataset is used, which includes 4,738 and 500 images, respectively. The image decoder outputs 512×512 resolution image for animal face category.

Third, training data on car. 8,144 images from the training split of the Stanford Cars dataset are used to learn the machine learning model. For evaluations, 1,000 images from the test set are randomly selected due to its large test split (8,041 images). The image decoder outputs 512×384 resolution image for car category.

Fourth, training data on horse. LSUN horse dataset for training and testing images is used. As the train-test split is not identified, 20,000 images are randomly selected for training and 2,000 images for testing. The image decoder outputs 256×256 resolution image for horse category.

At operation 1410, the system encodes the content image and the style image using a machine learning model to obtain content features and style features. In some cases, the operations of this step refer to, or may be performed by, an image encoder as described with reference to FIGS. 2-4, and 16.

At operation 1415, the system aligns the content features and the style features to obtain a sparse correspondence map that indicates a correspondence between a sparse set of pixels of the content image and corresponding pixels of the style image. In some cases, the operations of this step refer to, or may be performed by, an alignment component as described with reference to FIGS. 2-4, and 16.

At operation 1420, the system generates a hybrid image based on the sparse correspondence map, where the hybrid image depicts an object from the content image and an appearance attribute from the style image. In some cases, the operations of this step refer to, or may be performed by, an image decoder as described with reference to FIGS. 2-4, and 16.

At operation 1425, the system updates parameters of the machine learning model based on the hybrid image. In some cases, the operations of this step refer to, or may be performed by, a training component as described with reference to FIG. 2.

According to some embodiments, the training component uses the following total loss to train the machine learning model. The total loss is formulated as a weighted summation of the three losses:

$$\mathcal{L} = \mathcal{L}_{rec} + \alpha \mathcal{L}_{reg} + \beta \mathcal{L}_{CCL} \tag{5}$$

where $\alpha$ and $\beta$ are parameters to balance these losses.

Correspondence contrastive loss $\mathcal{L}_{CCL}$ is used to increase object appearance transfer, i.e., greedy texture transfer without structure distortion of the object. For example, the training component selects positive and negative samples for a given query patch that are determined based on the correspondences. The correspondence contributes to the disentangling of structural and textural features during training. Training of the machine learning model includes a correspondence contrastive loss (CCL) for mining hard negative samples that are selected based on correspondences. Hard negatives can help the model avoid coupling of content and style. Detail regarding correspondence contrastive loss $\mathcal{L}_{CCL}$ will be described in FIG. 15.

Detail regarding reconstruction loss $\mathcal{L}_{rec}$ and the regularization loss $L_{reg}$ will be described in FIG. 16. The parameters of the image encoder are learned by freezing the pre-trained StyleGAN2 decoder. In some examples, the weights may be set as $\alpha=1$ and $\beta=0$ with regards to the losses for 500 k iterations. Next, the machine learning model is fine-tuned by setting $\beta=10$ for the subsequent 500 k iterations.

FIG. 15 shows an example of training a machine learning model based on a correspondence contrastive loss according to aspects of the present disclosure. Training component 220 of FIG. 2 is used to train a machine learning model based on a correspondence contrastive loss. The example shown includes content image 1500, style image 1505, negative sample pair 1510, random-sampled negatives 1512, positive sample pair 1515, and transferred result 1520. FIG. 15 illustrates the collected negative samples following correspondence contrastive loss (CCL). The circled dots on style image 1505 indicate positive samples, and circled dots on content image 1500 are hard negative samples selected based on their correspondence to the query location (i.e., circled dot on transferred result 1520). Random-sampled negatives 1512 are randomly sampled negatives that are weaker than the selected negatives (i.e., negative sample pair 1510).

According to an embodiment, correspondence contrastive loss is used to separate the structure from texture or appearance. The correspondence contrastive loss (CCL) includes a contrastive loss that associates the patches that have a similar structure to each other while disassociating them from other patches although with similar textures. In some examples, the contrastive setting can be applied to unpaired image-to-image translation by collecting negative samples with randomly cropped patches. However, such random-sampled negatives 1512 cannot efficiently distinguish where the textures of interest are located, and random-sampled negatives 1512 contain background clutters or occluded regions that would distract the learning process.

Correspondence contrastive loss identifies negative samples by ranking the patches based on the similarity scores estimated in the latent alignment step. In some examples, given a query position i and an associated positive correspondence (i,j)∈p, negative samples n are collected with a threshold $\gamma$, $$n^i(i,j)=\{k|\text{rank}(S_{i,j}^l)>\gamma, k\neq i\} \quad (6)$$

where rank(•) returns the rank of values sorted in descending order. The collected negative samples consistently capture the relevant textures to the given query position, thus providing harder negatives compared to random samples during training.

The correspondence contrastive loss is formulated and minimized as follows:

$$\mathcal{L}_{CCL} = \sum_{(i,j)\in p} -\log \frac{C_{i,i}}{\sum_{n(i,j)} C_{i,n(i,j)} + C_{i,i}} \quad (7)$$

where $C_{i,j}=\exp((F_i^{2\rightarrow 1}\cdot F_j^1)/(\tau\cdot\|F_i^{2\rightarrow 1}\|\cdot\|F_j^1\|))$ and $F^{2\rightarrow 1}=E(I^{2\rightarrow 1})$. The superscript 1 is omitted herein. In some examples, the temperature $\tau=0.03$ and the threshold $\gamma=256$.

Content image 1500 is an example of, or includes aspects of, the corresponding element described with reference to FIGS. 3, 4, 6, 13, and 16. Style image 1505 is an example of, or includes aspects of, the corresponding element described with reference to FIGS. 3, 4, 6, 13, and 16.

FIG. 16 shows an example of a method for training a machine learning model based on a reconstruction loss and a regularization loss according to aspects of the present disclosure. Training component 220 of FIG. 2 is used to train a machine learning model based on a reconstruction loss and a regularization loss. The example shown includes content image 1600, style image 1605, image encoder 1610, alignment component 1615, image decoder 1620, and hybrid image 1625.

The reconstruction loss $\mathbb{R}_{rec}$ includes mean square error (MSE) and LPIPS which learn pixel-wise and perceptual similarities. For the regularization loss $L_{reg}$, the training component uses loss terms that encourage the extracted latent vectors to be smoothly distributed and lie within the latent space of StyleGAN.

According to an embodiment, reconstruction loss $\mathbb{R}_{rec}$ is used to train the machine learning model in an unsupervised manner. In some cases, the reconstruction loss encourages the machine learning model to maintain consistency between the original image and predicted image. The reconstruction loss includes mean square error (MSE) for pixel-wise similarity and LPIPS for perceptual similarity. The reconstruction loss is applied to content image and style image such that:

$$\mathbb{R}_{rec}=\lambda_{mse}\mathbb{R}_{mse}+\lambda_{LPIPS}\mathbb{R}_{LPIPS} \quad (8)$$

where $$\mathbb{R}_{mse}=\Sigma_{k\in\{1,2\}}\Sigma_i\|I_i^k-\tilde{I}_i^k\|_2 \quad (9)$$

$$\mathbb{R}_{LPIPS}=\Sigma_{k\in\{1,2\}}\Sigma_i\|P(I^k)_i-P(\tilde{I}^k)_i\|_2 \quad (10)$$

$\tilde{I}=D(E_{mod}(E(I)))$, and P is the perceptual feature extractor. In some cases, two regularization losses are used for the encoder such that:

$$\mathbb{R}_{reg}=\lambda_{avg}\mathbb{R}_{avg}+\lambda_{adv}\mathbb{R}_{adv} \quad (11)$$

$\bar{F}$ is the average latent vector of the pre-trained StyleGAN2 generator. The first loss encourages the extracted latent vectors to be close to the average latent vector of the pre-trained StyleGAN2 generator ($\bar{F}$):

$$\mathbb{R}_{avg}=\Sigma_{k\in\{1,2,2\rightarrow 1\}}\Sigma_l\|E_{mod}(F^{k,l})-\bar{F}\|_2 \quad (12)$$

An additional loss term further encourages the individual latent vectors $E_{mod}(F^l)$ to lie within the distribution of the StyleGAN2 latent space based on the adversarial formulation, such that:

$$\mathbb{R}_{adv}=\Sigma_{k\in\{1,2,2\rightarrow 1\}}\Sigma_l\mathbb{R}_E^{k,l}+\mathbb{R}_M^{k,l} \quad (13)$$

where $\mathbb{R}_E$ and $\mathbb{R}_M$ are the adversarial losses for the image encoder E and the discriminator M, respectively. In some examples, the discriminator for adversarial loss in $\mathbb{R}_{adv}$ includes a 4-layer multi-layer perceptron (MLP) network using LeakyReLU activations. $\mathbb{R}_E$ and $\mathbb{R}_M$ are formulated as follows:

$$\mathbb{R}_E^{k,l}=-\log M(E_{mod}(F^{k,l})) \quad (14)$$

$$\mathbb{R}_M^{k,l}=-\log M(\bar{F})-\log(1-M(E_{mod}(F^{k,l}))) \quad (15)$$

In some examples, the values of balancing parameters are set to $\{\lambda_{mse},\lambda_{LPIPS},\lambda_{avg},\lambda_{adv}\}=\{1,1,0.0001, 0.1\}$.

Content image 1600 is an example of, or includes aspects of, the corresponding element described with reference to FIGS. 3, 4, 6, 13, and 15. Style image 1605 is an example of, or includes aspects of, the corresponding element described with reference to FIGS. 3, 4, 6, 13, and 15. Hybrid image 1625 is an example of, or includes aspects of, the corresponding element described with reference to FIGS. 3, 4, and 6.

Image encoder 1610 is an example of, or includes aspects of, the corresponding element described with reference to FIGS. 2-4. Alignment component 1615 is an example of, or includes aspects of, the corresponding element described with reference to FIGS. 2-4. Image decoder 1620 is an example of, or includes aspects of, the corresponding element described with reference to FIGS. 2-4.

Performance of apparatus, systems and methods of the present disclosure have been evaluated, and results indicate embodiments of the present disclosure have obtained increased performance over existing technology. Example experiments demonstrate that image processing apparatus 200 of the present disclosure outperforms conventional systems.

Analysis and evaluation of image processing apparatus 200 for image reconstruction and appearance transfer tasks are described below. The effect of the latent alignment and CCL are demonstrated by ablation studies. Example evaluations are conducted on multiple datasets, i.e., CelebA-HQ for human face, AFHQ for animal face, Stanford Cars for car, and LSUN for horse. The train-test splits of the datasets are used in training and evaluation, except for the human face where the FFHQ dataset was used for training.

Machine learning model 225 encodes images into the latent space with high fidelity for precise transfer of local textures. Machine learning model 225 of the present disclosure outperforms baseline methods in reconstruction score. Machine learning model 225 runs fast with a single feed-forward pass through the model and hence computational resource is decreased.

Additionally, image processing apparatus 200 is evaluated on appearance transfer task, i.e., how consistently image processing apparatus 200 transfers the texture of the style image while preserving the structure from the content image. Evaluation follows human evaluation study using Amazon Mechanical Turk (AMT) designed with Two-alternative Forced Choice (2AFC). In some examples, participants are asked to choose which better preserves the content and which better transfers the style, respectively. Moreover, participants are asked which they like better overall. Reports collect 20,000 user votes over multiple baselines and datasets. Results demonstrate that image processing apparatus 200 outperforms all baseline methods in texture transfer. All numbers in the Texture column are greater than 50, which means that over half of the users prefer results from image processing apparatus 200 as compared to the other methods. For overall evaluation, image processing apparatus 200 outperforms all baselines.

The qualitative comparison indicates improvements of image processing apparatus 200 over the baselines in object structure preservation and accurate texture transfer. Conventional models encoding global texture distribution (e.g., SAE) fail to capture fine-grained local texture. For content preservation, conventional models based on image warping, e.g., WST and DST, are difficult to maintain the structure from content image due to inaccurate correspondence estimation.

To examine the effects of model components, i.e., latent alignment and correspondence contrastive loss (CCL), ablation studies for appearance transfer task are conducted on CelebA-HQ dataset. Self-similarity distance and single-image Frechet Inception Distance (FID) are used to measure the distance of two images in content and style, respectively. The self-similarity distance computes the self-similarity map of the features extracted from a pretrained network. The single-image FID calculates the Frechet Inception Distance between two feature distributions of given image pair. Regarding the effects of latent alignment, the results of the full model are preferred about two times more than the one without latent alignment in texture transfer and overall quality. The full model achieves lower distances in both single-image FID and self-similarity distance, which demonstrates that using sparse but confident matches can increase structure preservation and stylization at the same time.

Regarding the effects of correspondence contrastive loss, the full model is compared to that trained with randomly collected negatives or trained without CCL. The negative samples collected with the guidance of correspondences significantly improves disentanglement of structural and textural components.

Regarding the effects of control index n, when the index n increases, the single-image FID becomes larger while the self-similarity distance gets smaller. For each curve, both distances change gradually in accordance with the variations of index n.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
encoding a content image and a style image using a machine learning model to obtain content features and style features, wherein the content image includes a first object having a first appearance attribute and the style image includes a second object having a second appearance attribute;
computing a pixel-wise similarity score between a pixel from the content image and a pixel from the style image based on the content features and the style features;
including the pixel from the content image in a sparse set of pixels of the content image based on the pixel-wise similarity score;
aligning the content features and the style features to obtain a sparse correspondence map that indicates a correspondence between the sparse set of pixels of the content image and corresponding pixels of the style image; and
generating a hybrid image based on the sparse correspondence map, wherein the hybrid image depicts the first object having the second appearance attribute.

2. The method of claim 1, further comprising:
generating a first content feature map at a first scale and a second content feature map at a second scale, wherein the content features include the first content feature map and the second content feature map.

3. The method of claim 1, further comprising:
generating a first style feature map at a first scale and a second style feature map at a second scale, wherein the style features include the first style feature map and the second style feature map.

4. The method of claim 1, further comprising:
computing a first maximum pixel-wise similarity score for the pixel from the content image;
computing a second maximum pixel-wise similarity score for the pixel from the style image; and
computing a consistency score based on the first maximum pixel-wise similarity score and the second maximum pixel-wise similarity score, wherein the pixel from the content image is included in the sparse set of pixels of the content image based on the consistency score.

5. The method of claim 1, further comprising:
identifying a layer index for a decoder of the machine learning model;
providing the content features as a first input to at least one layer of the decoder having a first index that is less than the layer index;
combining the sparse correspondence map with the style features to obtain aligned style features; and providing the aligned style features as a second input to at least one subsequent layer of the decoder having a second index that is greater than the layer index, wherein the hybrid image comprises an output of the decoder.

6. The method of claim 5, further comprising:
determining a desired level of detail to be transferred from the style image to the content image; and
selecting the layer index based on the desired level of detail.

7. The method of claim 1, further comprising:
determining that the second object corresponds to the first object, wherein the alignment is based on the determination.

8. The method of claim 1, further comprising:
identifying a first plurality of objects in the content image;
identifying a second plurality of objects in the style image; and
mapping the first plurality of objects to the second plurality of objects, wherein the alignment is based on the mapping.

9. The method of claim 1, wherein:
the second appearance attribute comprises color information, texture information, or a combination thereof.

10. A method for training a machine learning model, comprising:
receiving a training set including a content image and a style image;
encoding the content image and the style image using a machine learning model to obtain content features and style features;
computing a pixel-wise similarity score between a pixel from the content image and a pixel from the style image based on the content features and the style features;
including the pixel from the content image in a sparse set of pixels of the content image based on the pixel-wise similarity score;
aligning the content features and the style features to obtain a sparse correspondence map that indicates a correspondence between the sparse set of pixels of the content image and corresponding pixels of the style image;
generating a hybrid image based on the sparse correspondence map, wherein the hybrid image depicts an object from the content image and an appearance attribute from the style image; and
updating parameters of the machine learning model based on the hybrid image.

11. The method of claim 10, further comprising:
generating a negative sample pair by randomly cropping the content image;
generating a positive sample pair by cropping the content image based on the pixel-wise similarity score; and
computing a correspondence contrastive loss based on the negative sample pair and the positive sample pair, wherein the parameters of the machine learning model are updated based on the correspondence contrastive loss.

12. The method of claim 10, further comprising:
encoding the hybrid image to obtain hybrid features; and
computing a regularization loss based on the content features, the style features, and the hybrid features, wherein the parameters of the machine learning model are updated based on the regularization loss.

13. The method of claim 10, further comprising:
generating a reconstructed content image based on the content features; and
computing a reconstruction loss based on the content image and the reconstructed content image, wherein the parameters of the machine learning model are updated based on the reconstruction loss.

14. The method of claim 13, further comprising:
generating a reconstructed style image based on the style features, wherein the reconstruction loss is computed based on the style image and the reconstructed style image.

15. An apparatus for image processing, comprising:
an image encoder configured to encode a content image and a style image using a machine learning model to obtain content features and style features, wherein the content image includes a first object having a first appearance attribute and the style image includes a second object having a second appearance attribute;
an alignment component configured to align the content features and the style features to obtain a sparse correspondence map that indicates a correspondence between a sparse set of pixels of the content image and corresponding pixels of the style image; and
an image decoder configured to generate a hybrid image based on the sparse correspondence map by identifying a layer index for the image encoder, providing the content features as a first input to at least one layer of the image decoder having a first index that is less than the layer index, combining the sparse correspondence map with the style features to obtain aligned style features, and providing the aligned style features as a second input to at least one subsequent layer of the image decoder having a second index that is greater than the layer index, wherein the hybrid image depicts the first object having the second appearance attribute.

16. The apparatus of claim 15, wherein:
the image encoder comprises a multi-scale convolutional neural network (CNN).

17. The apparatus of claim 15, wherein:
the image decoder comprises a generative adversarial network (GAN).

18. The apparatus of claim 15, further comprising:
a modulation encoder configured to project feature maps from the image encoder into an input vector space of the image decoder.

* * * * *